United States Patent
Vajjala et al.

(10) Patent No.: US 12,131,168 B1
(45) Date of Patent: Oct. 29, 2024

(54) OUTCOME-ORIENTED AUTOMATION PLATFORM

(71) Applicant: ServiceNow, Inc., Santa Clara, CA (US)

(72) Inventors: Venu Vajjala, Hyderabad (IN); Magesh Narayanan, Kirkland, WA (US); Yasaswini Potta, Hyderabad (IN); Shahil Sabbag, Hyderabad (IN); Atul Saini, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/302,746

(22) Filed: Apr. 18, 2023

(51) Int. Cl.
    *G06F 3/0481* (2022.01)
    *G06F 9/451* (2018.01)

(52) U.S. Cl.
    CPC ............ *G06F 9/451* (2018.02); *G06F 3/0481* (2013.01)

(58) Field of Classification Search
    CPC .............................. G06F 9/451; G06F 3/0481
    See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |

(Continued)

FOREIGN PATENT DOCUMENTS

| | | | | |
|---|---|---|---|---|
| CA | 3095562 A1 | * | 10/2019 | ............ G06F 11/323 |
| CN | 1619443 A | * | 5/2005 | ......... G05B 19/0426 |

(Continued)

OTHER PUBLICATIONS

David Khourshid, "Robust React User Interfaces with Finite State Machines", published on Nov. 13, 2017 to https://css-tricks.com/robust-react-user-interfaces-with-finite-state-machines, retrieved Jul. 30, 2023. (Year: 2017).*

(Continued)

*Primary Examiner* — Shourjo Dasgupta
(74) *Attorney, Agent, or Firm* — McDonnell Boehnen Hulbert & Berghoff LLP

(57) ABSTRACT

A method includes generating, for display by way of a graphical user interface (GUI), a graphical representation of an existing state of a plurality of computing resources that visually represents the plurality of computing resources and one or more relationships therebetween. The method also includes determining a target state of the plurality of computing resources based on a user modification of the graphical representation of the existing state. The user modification may be obtained by way of the GUI. The method additionally includes determining, based on a difference between the target state and the existing state, one or more operations configured to modify the plurality of computing resources to reach the target state from the existing state. The method further includes executing the one or more operations.

20 Claims, 17 Drawing Sheets

(56) References Cited

U.S. PATENT DOCUMENTS

| | | |
|---|---|---|
| 5,533,116 A | 7/1996 | Vesterinen |
| 5,623,680 A * | 4/1997 | Flora-Holmquist ........................ G05B 19/042 712/232 |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,946,485 A * | 8/1999 | Weeren ............ G06F 8/34 717/109 |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,131,184 A * | 10/2000 | Weeren ............ G06F 8/34 717/109 |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,637,023 B1 * | 10/2003 | Ginsberg ............ G06F 8/66 714/763 |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,882,490 B2 * | 2/2011 | Kodosky ............ G06F 8/10 717/109 |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,250,355 B2 * | 8/2012 | Eilam ............ H04L 41/0886 713/100 |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 8,818,783 B2 * | 8/2014 | Novaes ............ G06F 13/10 703/13 |
| 9,053,460 B2 | 6/2015 | Gilbert |
| 10,168,884 B2 | 1/2019 | Raveh et al. |
| 10,474,506 B1 * | 11/2019 | Gray ............ G06F 9/4498 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,080,905 B1 * | 8/2021 | McCarty ............ G06T 7/543 |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0004953 A1 * | 1/2003 | Cross ............ G06F 9/542 |
| 2003/0035010 A1 * | 2/2003 | Kodosky ............ G06F 8/61 715/771 |
| 2003/0101057 A1 * | 5/2003 | Torge ............ H04L 67/1001 704/270.1 |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0085681 A1 * | 4/2006 | Feldstein ............ G06F 11/3692 714/25 |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0266329 A1 * | 11/2007 | Gaudette ............ G06F 8/34 715/763 |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0193363 A1 | 7/2009 | Atherton |
| 2009/0228984 A1 | 9/2009 | Sterin |
| 2009/0282142 A1 * | 11/2009 | Tamura ............ G06F 9/4416 713/2 |
| 2010/0082039 A1 * | 4/2010 | Mohr ............ B25J 9/1692 700/83 |

(56) References Cited

U.S. PATENT DOCUMENTS

| | | | |
|---|---|---|---|
| 2010/0110932 A1 | 5/2010 | Doran | |
| 2012/0054511 A1* | 3/2012 | Brinks | G06F 1/3243 |
| | | | 713/310 |
| 2012/0092375 A1* | 4/2012 | Bellamy | G06T 11/60 |
| | | | 345/640 |
| 2013/0073993 A1* | 3/2013 | Schimpf | G06F 3/048 |
| | | | 715/762 |
| 2013/0097295 A1* | 4/2013 | Garza | H04L 41/0896 |
| | | | 709/223 |
| 2013/0346615 A1* | 12/2013 | Gondi | G06F 9/5077 |
| | | | 709/226 |
| 2014/0324514 A1* | 10/2014 | Lo | G06Q 10/06 |
| | | | 705/7.26 |
| 2017/0084273 A1 | 3/2017 | Zohar et al. | |
| 2018/0123940 A1 | 5/2018 | Rimar | |
| 2019/0073257 A1 | 3/2019 | Dasgupta | |
| 2019/0104398 A1 | 4/2019 | Owen | |
| 2020/0050689 A1 | 2/2020 | Tal | |
| 2020/0204443 A1 | 6/2020 | Bar Oz | |
| 2020/0228412 A1* | 7/2020 | Abu Asba | H04L 43/0876 |
| 2020/0296173 A1 | 9/2020 | Feiguine et al. | |
| 2020/0301678 A1 | 9/2020 | Burman | |
| 2021/0194764 A1 | 6/2021 | Badyan | |
| 2022/0029886 A1 | 1/2022 | Hameiri | |
| 2022/0198362 A1* | 6/2022 | Griffin | G06Q 10/06393 |

FOREIGN PATENT DOCUMENTS

| | | | | |
|---|---|---|---|---|
| CN | 103197929 A | * | 7/2013 | |
| CN | 103197929 B | * | 3/2016 | |
| CN | 105677136 A | * | 6/2016 | |
| CN | 3032383 A1 | * | 8/2019 | |
| CN | 110221735 A | * | 9/2019 | G06F 3/04817 |
| CN | 110308962 A | * | 10/2019 | G06F 16/27 |
| CN | 108762747 B | * | 2/2022 | G06F 8/30 |
| EP | 0433979 A2 | | 6/1991 | |
| EP | 1315147 A1 | * | 5/2003 | H04L 67/1002 |
| EP | 1607824 A2 | | 12/2005 | |
| EP | 1532496 B1 | * | 7/2010 | G05B 19/0426 |
| JP | 2010272034 A | * | 12/2010 | |
| WO | WO-8807719 A2 | * | 10/1988 | |
| WO | 9934285 W | | 7/1999 | |
| WO | 0052559 W | | 9/2000 | |
| WO | 0179970 W | | 10/2001 | |
| WO | 2017046830 A1 | | 3/2017 | |
| WO | WO-2023060025 A1 | * | 4/2023 | H04L 41/40 |

OTHER PUBLICATIONS

"Model Finite State Machines by Using Stateflow Charts—MATLAB & Simulink", published on Mar. 11, 2022 to https://www.mathworks.com/help/stateflow/ug/finite-state-machine-concepts.html, retrieved Jul. 30, 2023. (Year: 2022).*

"Rethinking Visual Programming with Go", published on Jun. 1, 2019 to https://divan.dev/posts/visual_programming_go/, retrieved Jun. 20, 2024. (Year: 2019).* cpressey, "Facts about State Machines", published on Sep. 30, 2022 to https://news.ycombinator.com/item?id=33025466, retrieved Aug. 1, 2024. (Year: 2022).*

"State Machine Workflows", published on Sep. 15, 2021 to https://learn.microsoft.com/en-us/dotnet/framework/windows-workflow-foundation/state-machine-workflows, retrieved Aug. 1, 2024. (Year: 2021).*

"Welcome to the world of Statecharts", published on Dec. 30, 2017 to https://statecharts.dev/, retrieved Aug. 1, 2024. (Year: 2017).*

Ashwin Kumar, etc., "VizXP: A Visualization Framework for Conveying Explanations to Users in Model Reconciliation Problems", published via the proceedings of the Thirty-Second International Conference on Automated Planning and Scheduling, 2022, retrieved Aug. 1, 2024. (Year: 2022).*

Automate Infrastructure on Any Cloud with Terraform, https://www.terraform.io/, downloaded from Internet Apr. 17, 2023.

International Searching Authority, International Search Report and Written Opinion, mailed May 31, 2024, issued in connection with International Patent Application No. PCT/US2024/014103, filed Feb. 1, 2024, 9 pages.

* cited by examiner

OUTCOME-ORIENTED AUTOMATION PLATFORM

BACKGROUND

Computing resources may be deployed on a computing cloud. The computing resources may include hardware and/or software configured to perform various operations. As the type and/or amount of the operations changes over time, it may be desirable to modify the deployed computing resources based on the changes in the operations. However, modifying the deployed computing resources may depend on knowing and/or understanding various systems, instructions, and/or functions for managing the computing resources. Thus, modification of the computing resources may be difficult for and/or inaccessible to users lacking extensive experience with the various systems, instructions, and/or functions.

SUMMARY

Deployment of computing resources on a computing cloud, such as on a remote network management platform, may be facilitated by an outcome-oriented automation application. The outcome-oriented automation application may be configured to provide a graphical user interface (GUI) that facilitates visualization and/or modifications of various states of a plurality of computing resources deployed on the computing cloud. Specifically, the GUI may provide for display of an existing state of the plurality of computing resources, and modification of the existing state to define a target state of the plurality of computing resources. The target state may be defined by a user interacting with graphical components of the GUI to add, remove, move, copy, and/or otherwise alter computing resources to create a graphical representation of the target state. For example, the user may define the graphical representation of the target state by modifying a graphical representation of the existing state.

Additionally, the outcome-oriented automation application may be configured to determine operations configured to modify the computing resources to reach the target state from the existing state, and cause execution of the operations. The operations may be determined based on a difference between the existing state and the target state. An order in which to execute the operations may be based on dependencies among the computing resources. The operations may be selected from automations that have been predefined for the computing cloud to which the modifications are being made.

The GUI may include a first button configured to cause the operations to be generated, and a second button configured to cause the operations to be executed. In some implementations, the GUI may also provide for display of intermediate states planned to be reached between the existing and target state as a result of execution of the operations. For example, each of the operations may be associated with a corresponding intermediate state, thus allowing the user to examine, verify, and/or alter the changes planned to be implemented by the operations before execution thereof.

The GUI may additionally provide for display of a final state of the computing resources after execution of the operations. Thus, the GUI may indicate that execution of the operations resulted in the target state being reached, or that one or more of the operations caused the final state to differ from the target state. In some implementations, when the final state differs from the target state, the outcome-oriented automation application may be configured to determine alternative operations (e.g., differing entirely from the original operations) configured to further modify the computing resources to reach the target state from the final state. Thus, when the target state is not reached as planned, the GUI may include the alternative operations for reaching the target state in another manner, thus correcting for any shortcomings of the original operations.

Accordingly, a first example embodiment may involve generating, for display by way of a graphical user interface (GUI), a graphical representation of an existing state of a plurality of computing resources that visually represents the plurality of computing resources and one or more relationships therebetween. The first example embodiment may also involve determining a target state of the plurality of computing resources based on a user modification of the graphical representation of the existing state. The user modification may be obtained by way of the GUI. The first example embodiment may additionally involve determining, based on a difference between the target state and the existing state, one or more operations configured to modify the plurality of computing resources to reach the target state from the existing state. The first example embodiment may further involve executing the one or more operations.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
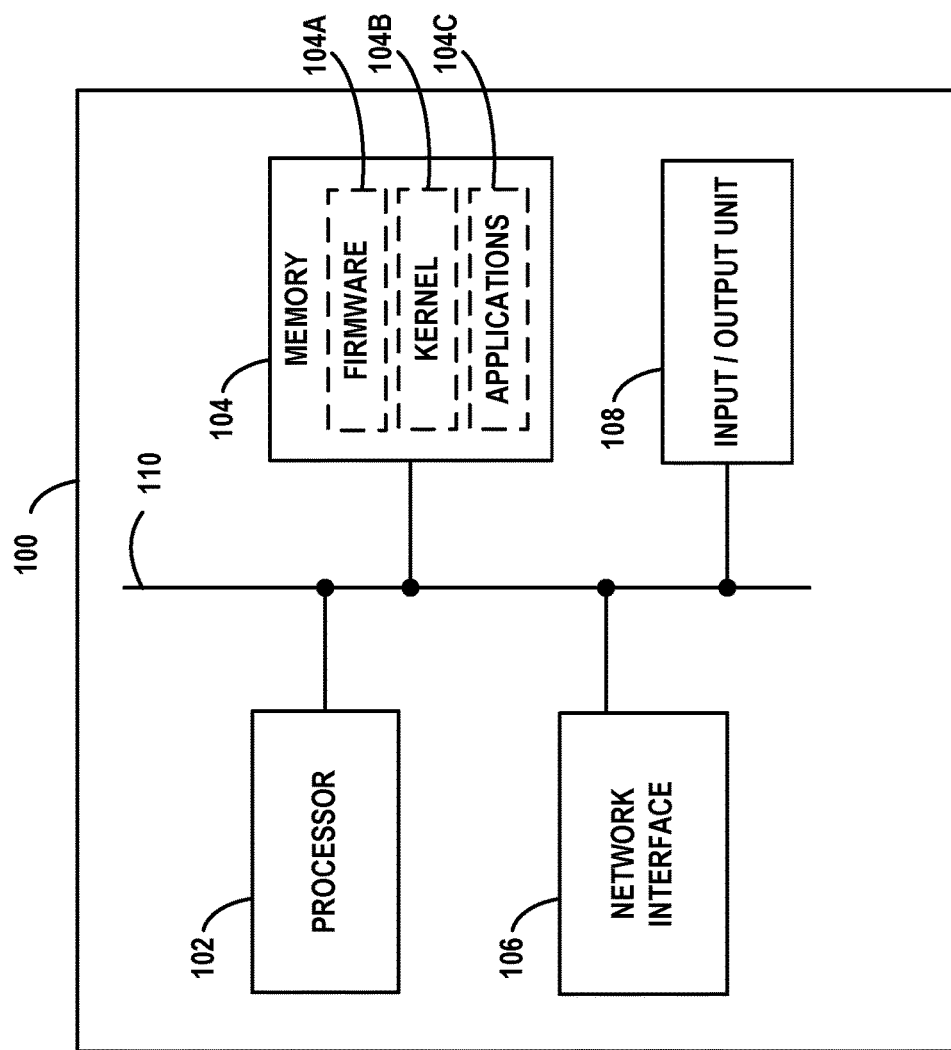
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
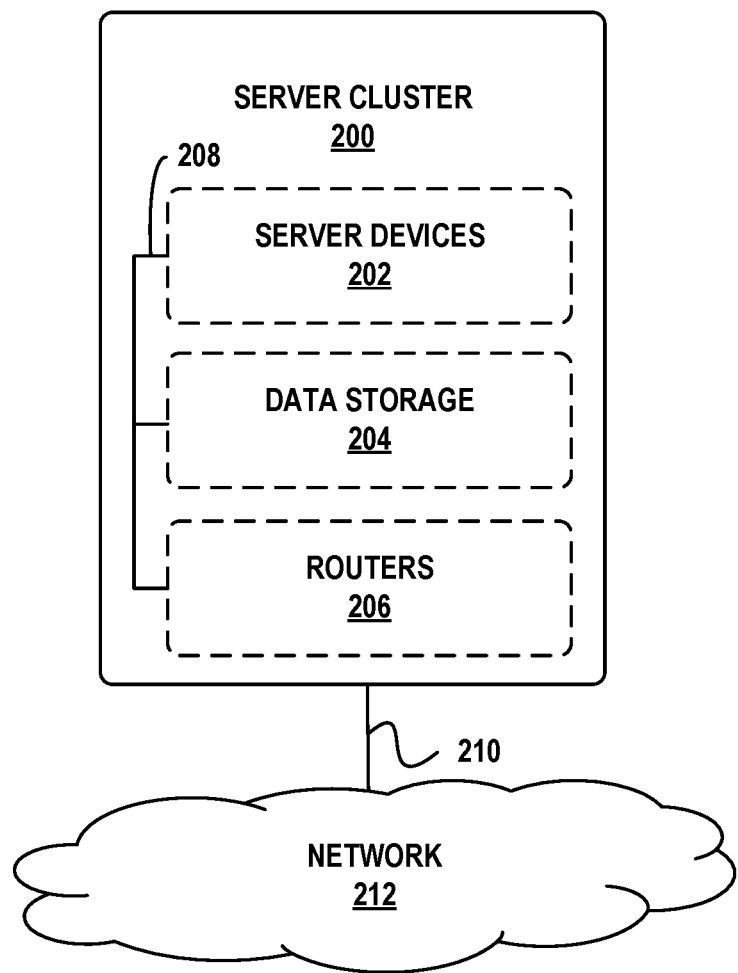
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
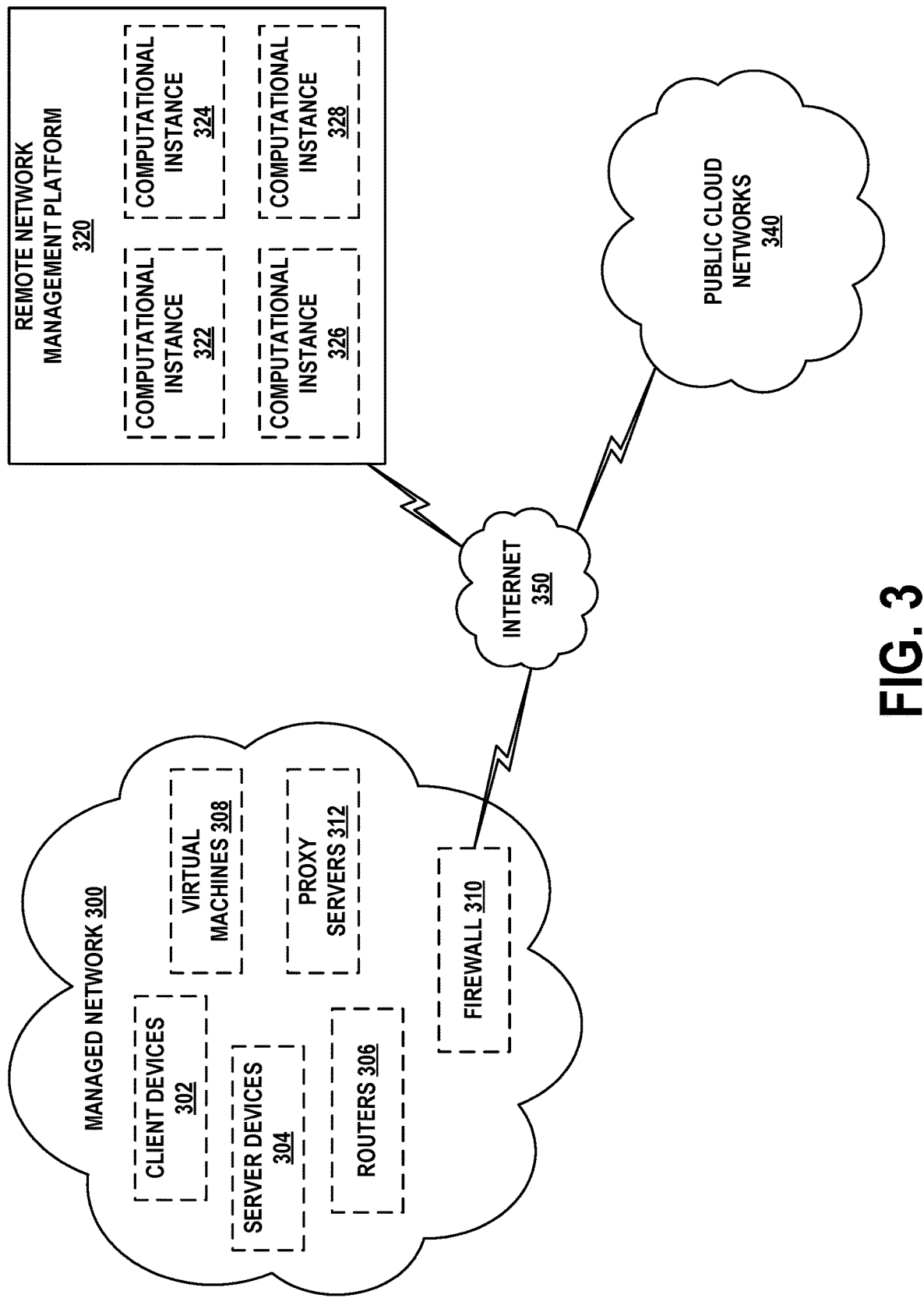
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
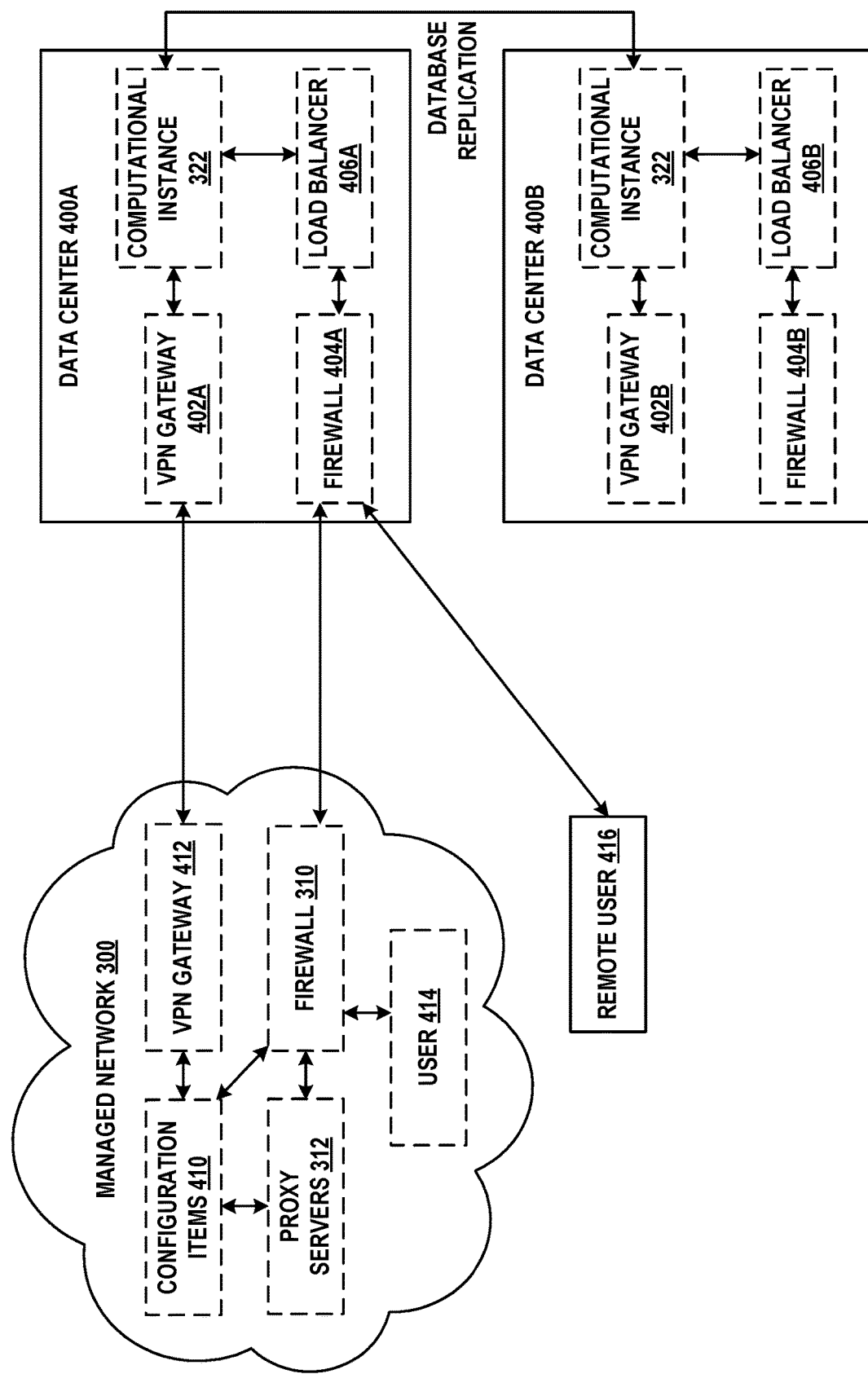
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP)

addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
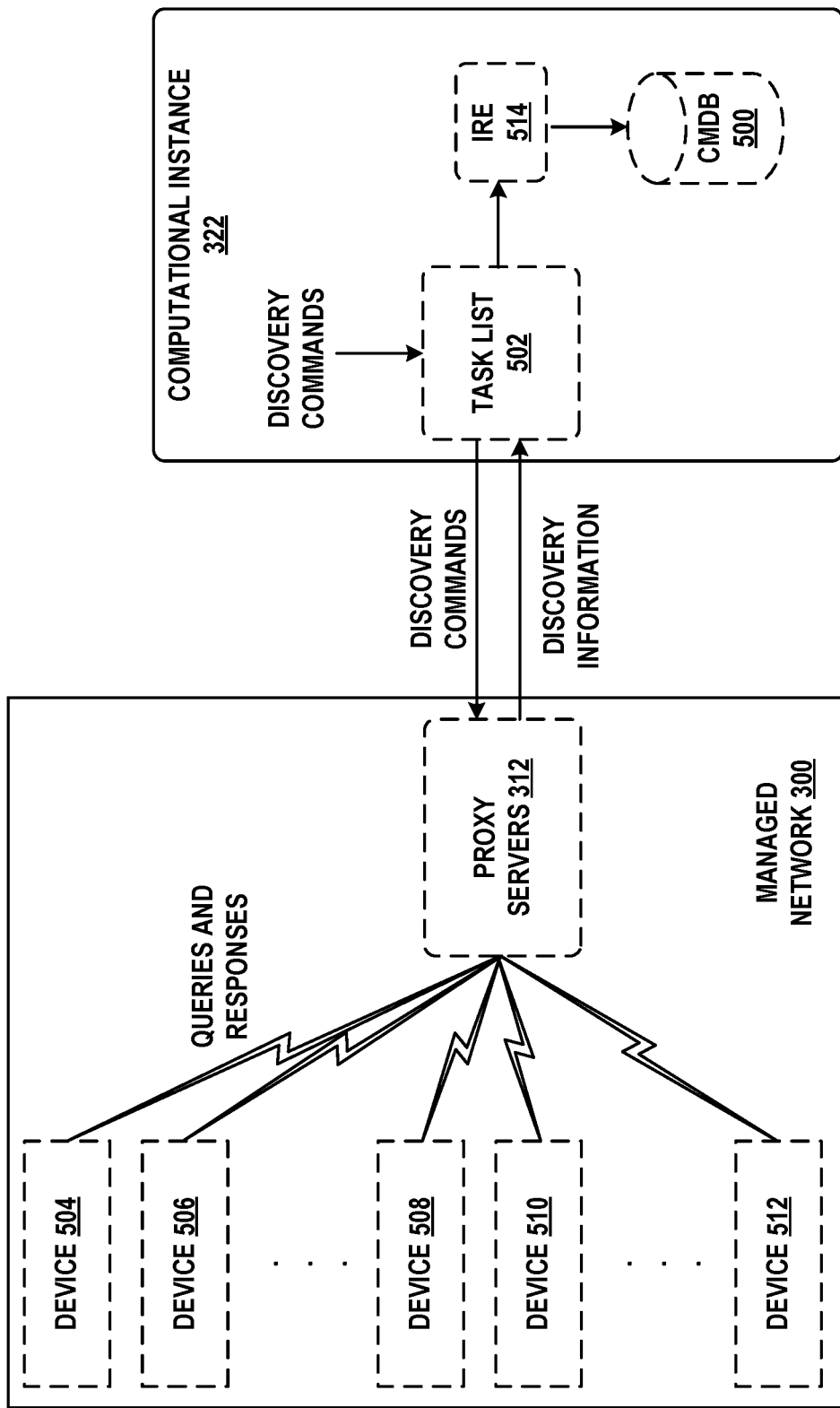
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pair-wise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Outcome-Oriented Software Application

Figure 6:
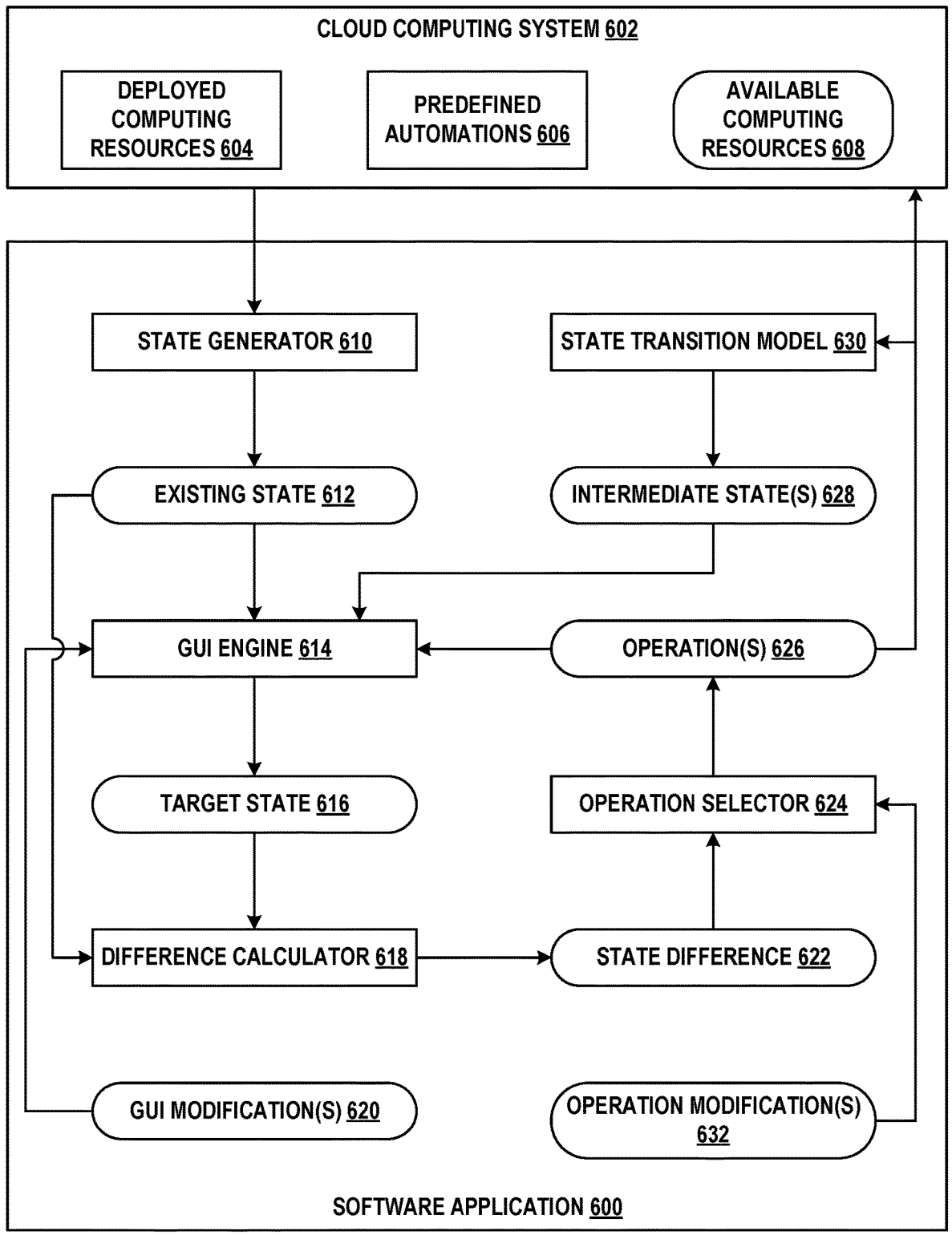
FIG. 6 illustrates a software application, in accordance with example embodiments.

FIG. 6 illustrates an example software application 600 that may be configured to facilitate deployment and modification of computing resources on cloud computing system 602. Specifically, software application 600 may be configured to provide a GUI by way of which aspects of cloud computing system 602 may be modifiable, and determine operations for implementing the modifications specified by way of the GUI. Software application 600 may alternatively be referred to as an outcome-oriented automation software application and/or a state-oriented software application, among other possibilities. Cloud computing system 602 may alternatively be referred to as a computing cloud. Remote network management platform 320 may provide one example of cloud computing system 602.

Cloud computing system 602 may include deployed computing resources 604, predefined automations 606, and available computing resources 608. Deployed computing resources 604 may include hardware and/or software that is currently deployed on (e.g., available for use) on cloud computing system 602, and may change over time as deployment of these computing resources is modified. Cloud computing system 602 may be configured to maintain a representation of deployed computing resources 604. For example, cloud computing system 602 may store, in a CMDB, CIs representing deployed computing resources 604.

Available computing resources 608 may represent computing resources that are deployable on cloud computing system 602. For example, available computing resources 608 may represent (i) a plurality of computing resource types, (ii) a plurality of relationship types among the plurality of computing resource types, and/or (iii) quantitative measures of how much of each computing resource type and/or each relationship type is available for deployment.

Predefined automations 606 may include operations configured to control deployment of computing resources on cloud computing system 602. For example, predefined automations 606 may be configured to modify aspects of deployed computing resources 604 and/or cause deployment of available computing resources 608. Each respective predefined automation of predefined automations 606 may include one or more corresponding operations configured to control at least one aspect of deployment of a corresponding computing resource of cloud computing system 602. For example, predefined automations 606 may be configured to deploy new computing resources, deploy copies of existing computing resources, restart existing computing resources, retire existing computing resources, migrate existing computing resources, modify attributes of existing computing resources, and/or restore previous computing resources, among other possibilities.

Predefined automations 606 may be specific to cloud computing system 602. Thus, manual control of deployment of computing resources on cloud computing system 602 may depend on familiarity and/or experience with predefined automations 606. That is, in order to effectively control aspects of cloud computing system 602, a user may need to understand the modifications executed by at least some of predefined automations 606. Accordingly, many potential users might be unable to make modifications to cloud computing system 602, and may instead depend on other, more experienced users for controlling cloud computing system 602. For example, when predefined automations 606 include hundreds of different automations, some of which may be interdependent, and each of which may be associated with extensive textual documentation detailing the correct usage thereof, it may be impractical for an inexperienced user to effectively use predefined automations 606.

Software application 600 may allow users to make modifications to cloud computing system 602 by way of a GUI, rather than by way of manual selection and execution of predefined automation 606. Software application 600 may be configured to use predefined automations 606 to make the modifications specified by way of the GUI. However, usage of the GUI may be independent of the users' familiarity and/or experience with predefined automations 606. Thus, software application 600 may make it easier and/or faster for users to make changes to cloud computing system 602.

Software application 600 may include state generator 610, GUI engine 614, difference calculator 618, operation selector 624, and state transition model 630. In some implementations, software application 600 may be implemented as part of cloud computing system 602. For example, software application may be hosted by cloud computing system 602. In other implementations, software application 600 may be implemented by a third-party system different from cloud computing system 602, and may be communicatively connected to cloud computing system 602.

State generator 610 may be configured to determine existing state 612 of deployed computing resources 604. Thus, existing state 612 may represent computing resources that are currently deployed on cloud computing system 602, relationships between these computing resources, and/or attributes of these computing resources. In some implementations, a relationship between two computing resources may be considered an attribute of each of the two or more computing resources. State generator 610 may be configured to obtain, from cloud computing system 602, CIs representing deployed computing resources 604, including any attributes thereof that are tracked by cloud computing system 602.

Figure 7A:
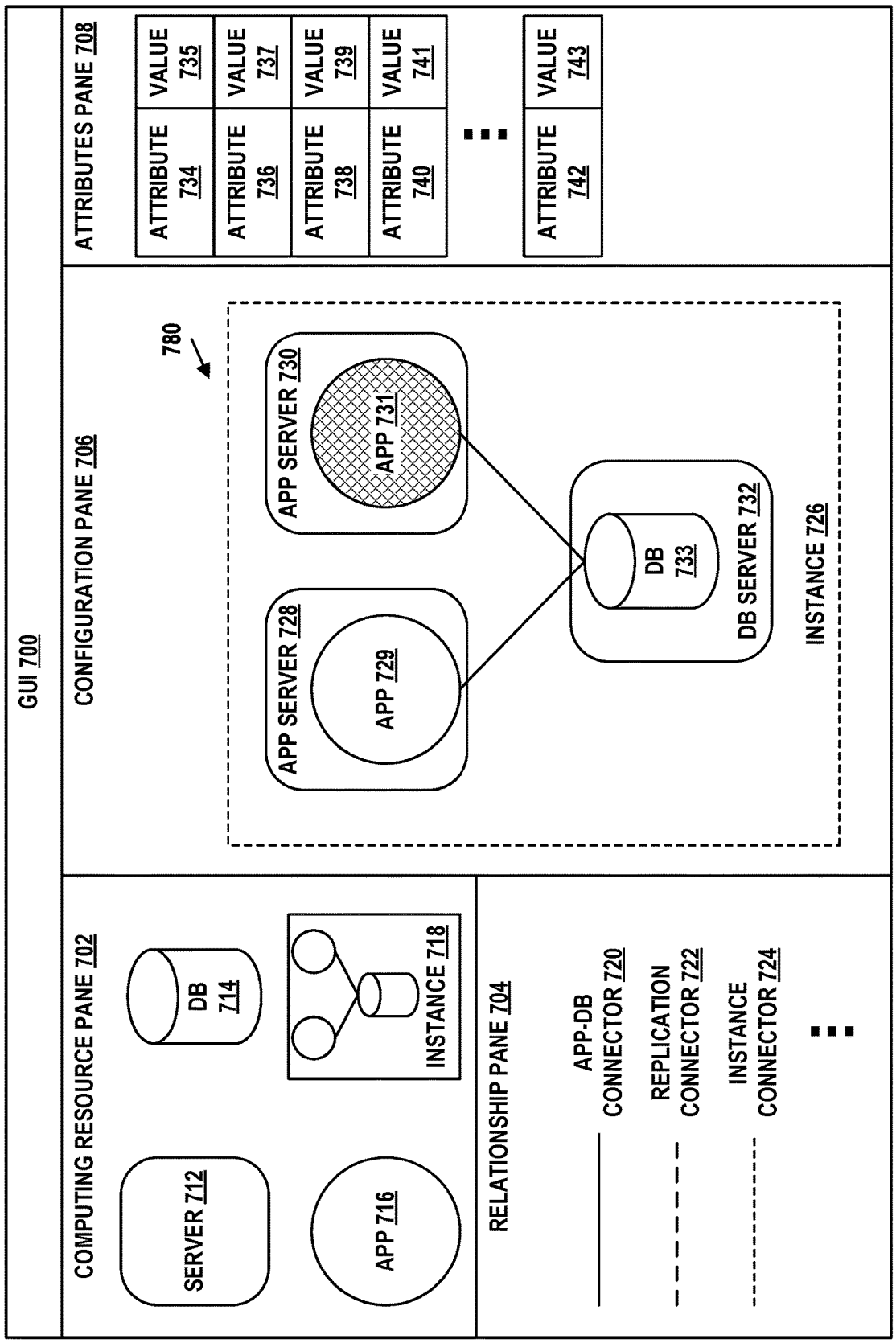
FIGS. 7A, 7B, 7C, 7D, 7E, 7F, 7G, 7H, 7I, and 7J illustrate example graphical user interfaces, in accordance with example embodiments.
Figure 7B:
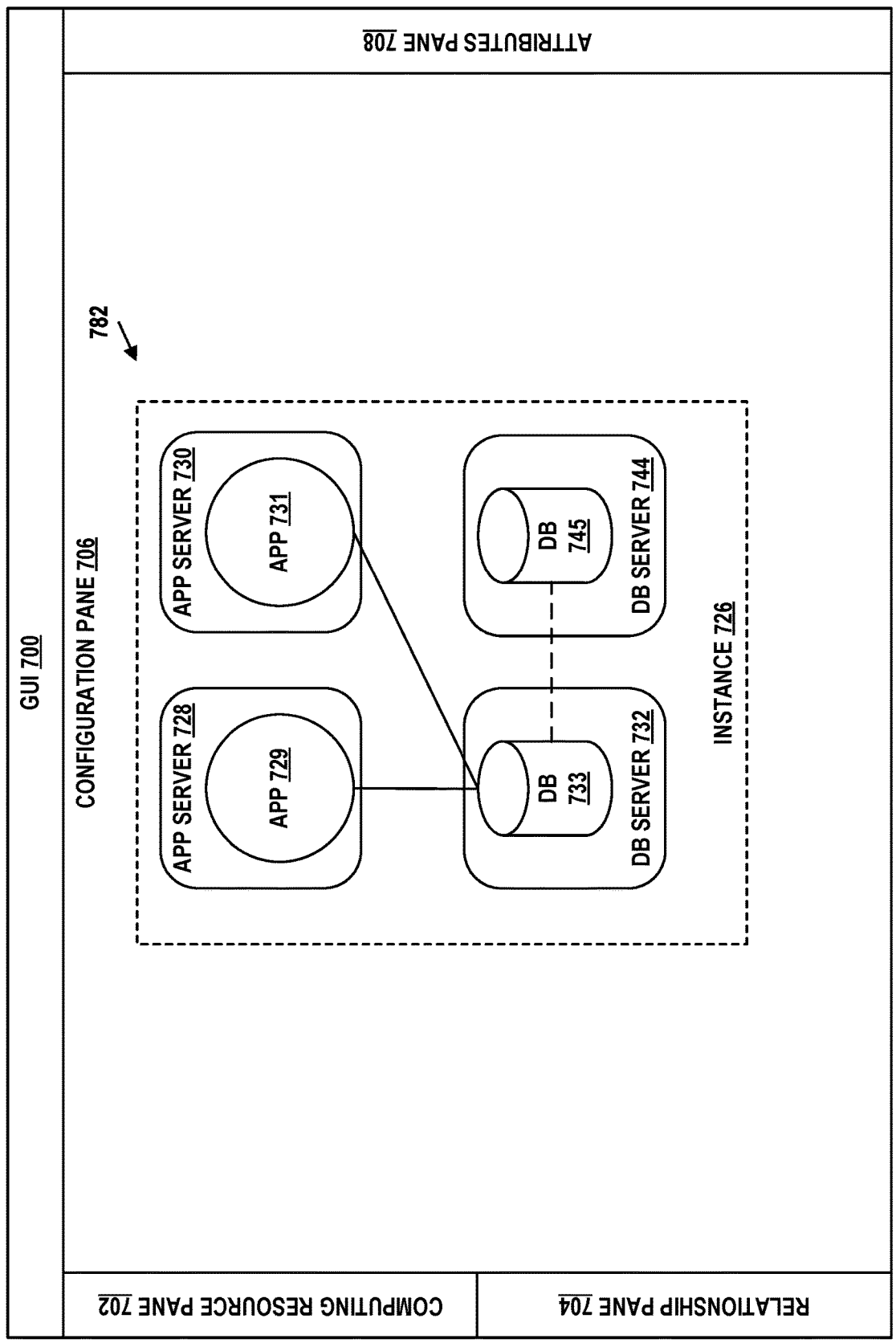

GUI engine 614 may be configured to generate a graphical representation of existing state 612, which may include graphical GUI components representing deployed computing resources 604. Thus, rather than representing deployed computing resources 604 using strings and/or structures with alphanumeric values, as may be done by the CIs, the graphical representation of existing state 612 may utilize graphical components (e.g., icons, lines, panes, visual tree structures, etc.) to represent deployed computing resources 604, relationships therebetween, and/or attributes thereof. FIGS. 7A and 7B provide examples of graphical representations of existing states.

Figure 7C:
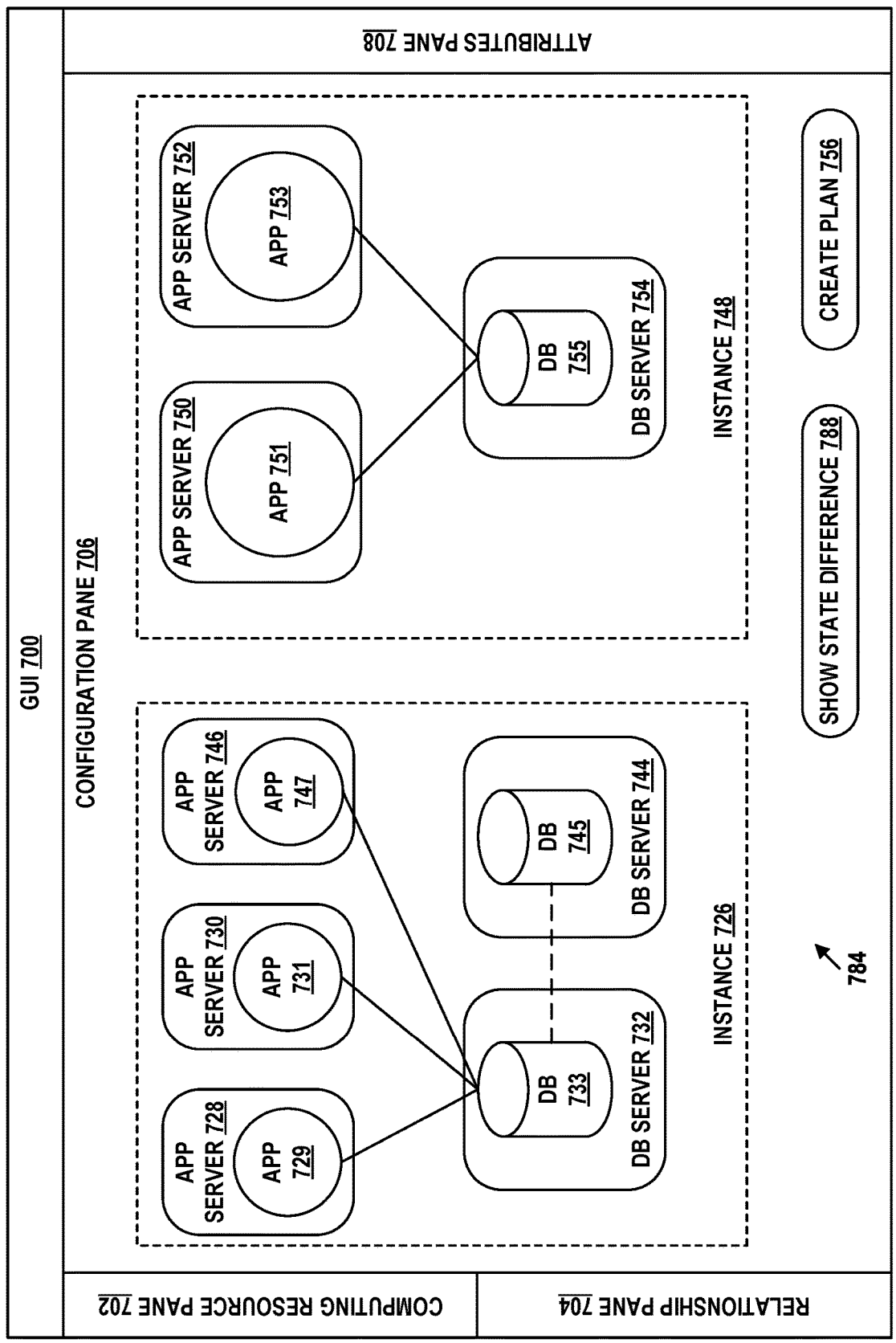

GUI engine 614 may also be configured to generate target state 616 based on GUI modification(s) 620 made by one or more users to the graphical representation of existing state 612. GUI modification(s) 620 may include addition, deletion, copying, moving and/or other changes to graphical icons to represent target changes in the number and/or arrangement of deployed computing resources 604. GUI modification(s) 620 may also include changes to values of one or more variables associated with the graphical icons to represent target changes in the attributes of deployed computing resources 604. Thus, target state 616 may indicate the computing resources, arrangement thereof, and/or attributes thereof that the one or more users would like to have deployed on cloud computing system 602. Target state 616 may differ from existing state 612, since target state 616 may be generated based on modification of the graphical representation of existing state 612. FIG. 7C provides an example graphical representation of a target state.

Figure 7D:
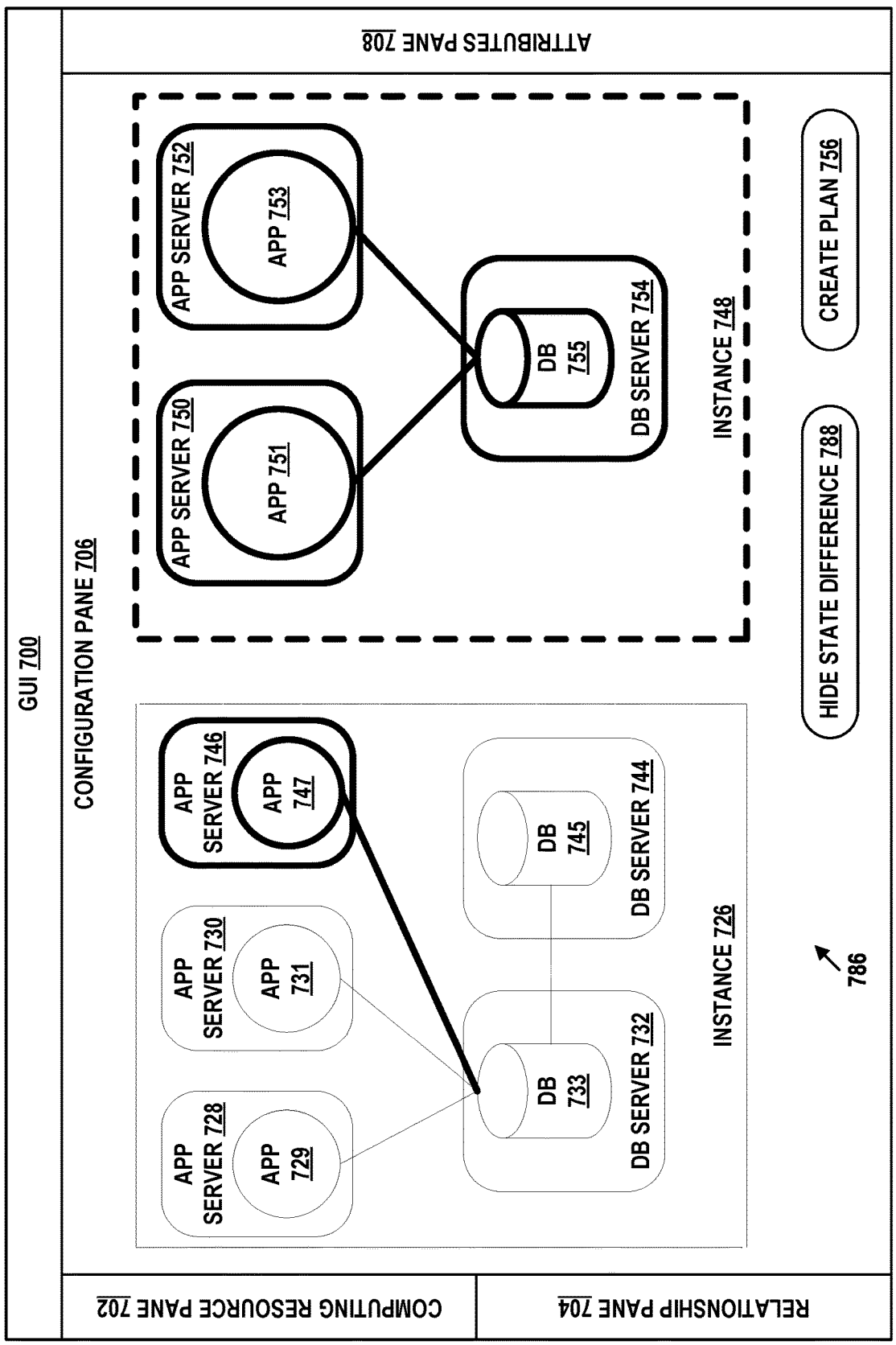

Difference calculator 618 may be configured to determine state difference 622 based on existing state 612 and target state 616. State difference 622 may represent the computing resources, relationships therebetween, and/or attributes thereof that changed between existing state 612 and target state 616. GUI engine 614 may be configured to generate a graphical representation of state difference 622. FIG. 7D provides an example graphical representation of a state difference.

State difference 622 may provide a programmatic representation of the target changes that were made by way of the GUI to reach target state 616 from existing state 612. Existing state 612, target state 616, and/or state difference may be represented using, for example, HASHICORP®

Configuration Language (HCL), JAVASCRIPT® Object Notation (JSON), and/or another programing language and/or data interchange format configured to represent computing resources. Difference calculator 618 may be configured to determine state difference 622 by determining textual differences between a first source code file representing existing state 612 and a second source code file representing target state 616.

Operation selector 624 may be configured to determine operation(s) 626 based on state difference 622. In one example, state difference 622 and/or operation(s) 626 may be determined based on and/or in response to selection of a plan creation GUI component provided as part of the GUI. Thus, state difference 622 and/or operation(s) 626 may be determined once the user indicates, by selecting the plan creation GUI component, that definition of target state 616 is complete. In another example, state difference 622 and/or operation(s) 626 may be determined automatically as the user makes modifications to existing state 612. For example, each of GUI modification(s) 620 may cause determination of an updated version of target state 616, an updated version of state difference 622, and an updated version of operation(s) 626. Thus, state difference 622 and/or operation(s) 626 may be determined concurrently with the user defining target state 616.

Operation(s) 626 may include one or more operations configured to modify deployed computing resources 604 to reach target state 616 from existing state 612. Thus, operation(s) 626 may, when executed, cause deployed computing resources 604 to be changed by state difference 622. Operation(s) 626 may include predefined automations 606 and/or portions thereof.

Operation selector 624 may be configured to determine operation(s) 626 by determining, for each respective modification in state difference 622, a corresponding operation configured to perform the respective modification. Thus, operation(s) 626 may include a corresponding operation for modifying each computing resource, relationship, and/or attribute indicated by state difference 622. Operation selector 624 may include a mapping between predefined automations 606 and possible modifications, and may use this mapping to select predefined automation corresponding to modifications indicated by state difference 622. For example, the mapping may indicate a modification expected to be accomplished by each respective predefined automation of predefined automation 606, and may thus be used to select a corresponding predefined automation for each modification indicated by state difference 622.

Operation(s) 626 may be ordered based on any dependencies among different computing resource types. For example, a software application might depend on a server node, and thus the server node may be deployed before the software application is deployed. Accordingly, operation selector 624 may include a representation of potential dependencies among computing resources, relationships therebetween, and/or attributes thereof. For example, the potential dependencies may be represented using a dependency graph, which may represent the manner in which cloud computing system 602 structures its computing resources. Thus, operation selector 624 may be configured to order operation(s) 626 based on the dependency graph, such that any prerequisites for deployment of a given computing resource are satisfied prior to an attempt to deploy the given computing resource.

Operation(s) 626 may be provided to GUI engine 614, which may be configured to generate a graphical representation of operation(s) 626. In some implementations, operation(s) 626 may be modifiable by way of the GUI. For example, an initial set of operation(s) 626 may be altered based on operation modification(s) 632 made by a user by way of the GUI, and an updated set of operation(s) 626 may be determined by operation selector 624 based on operation modification(s) 632. Thus, in some cases the user may execute operation(s) 626 as generated by operation selector 624, while in other cases the user may modify operation(s) 626 prior to execution.

Figure 7E:
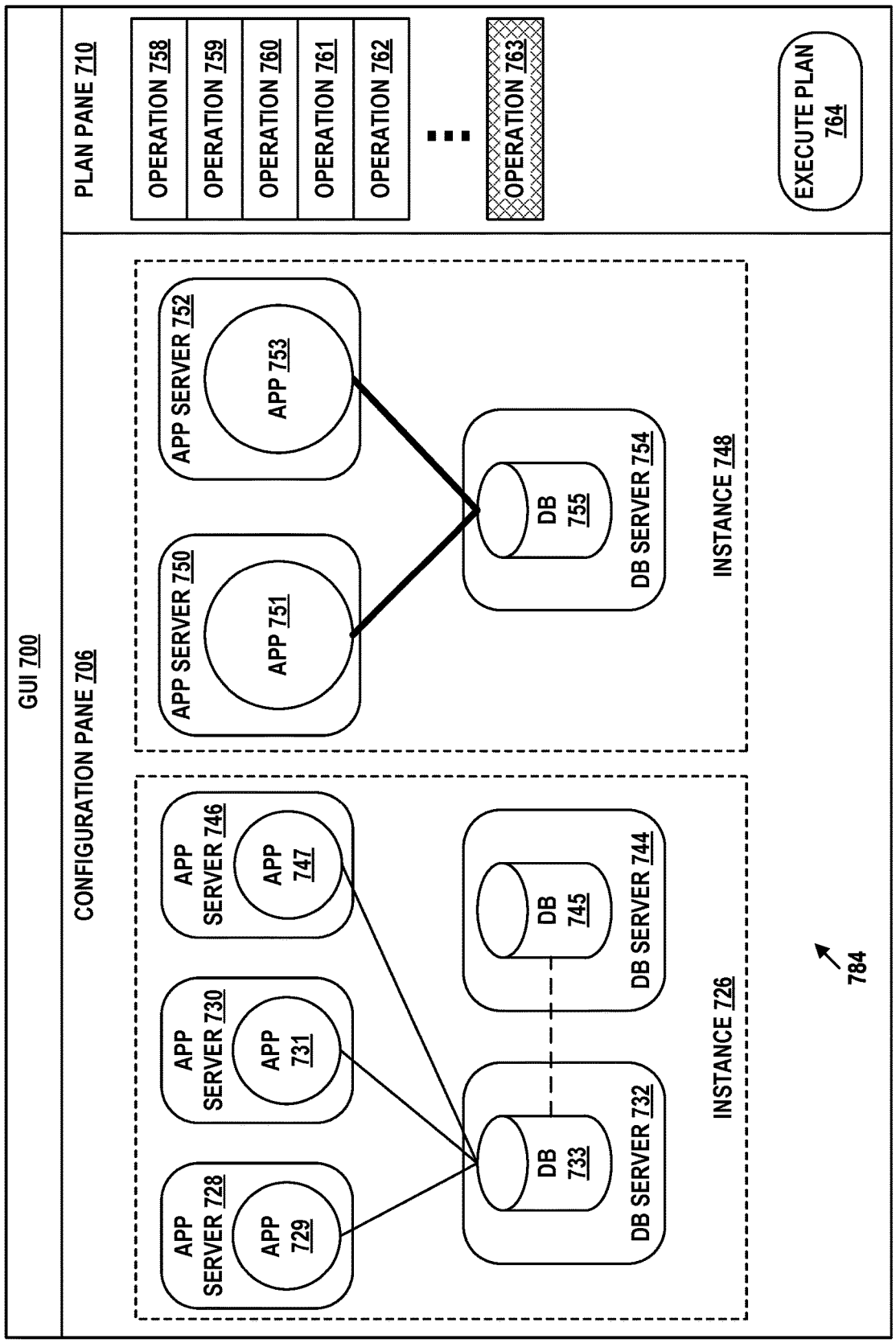
Figure 7F:
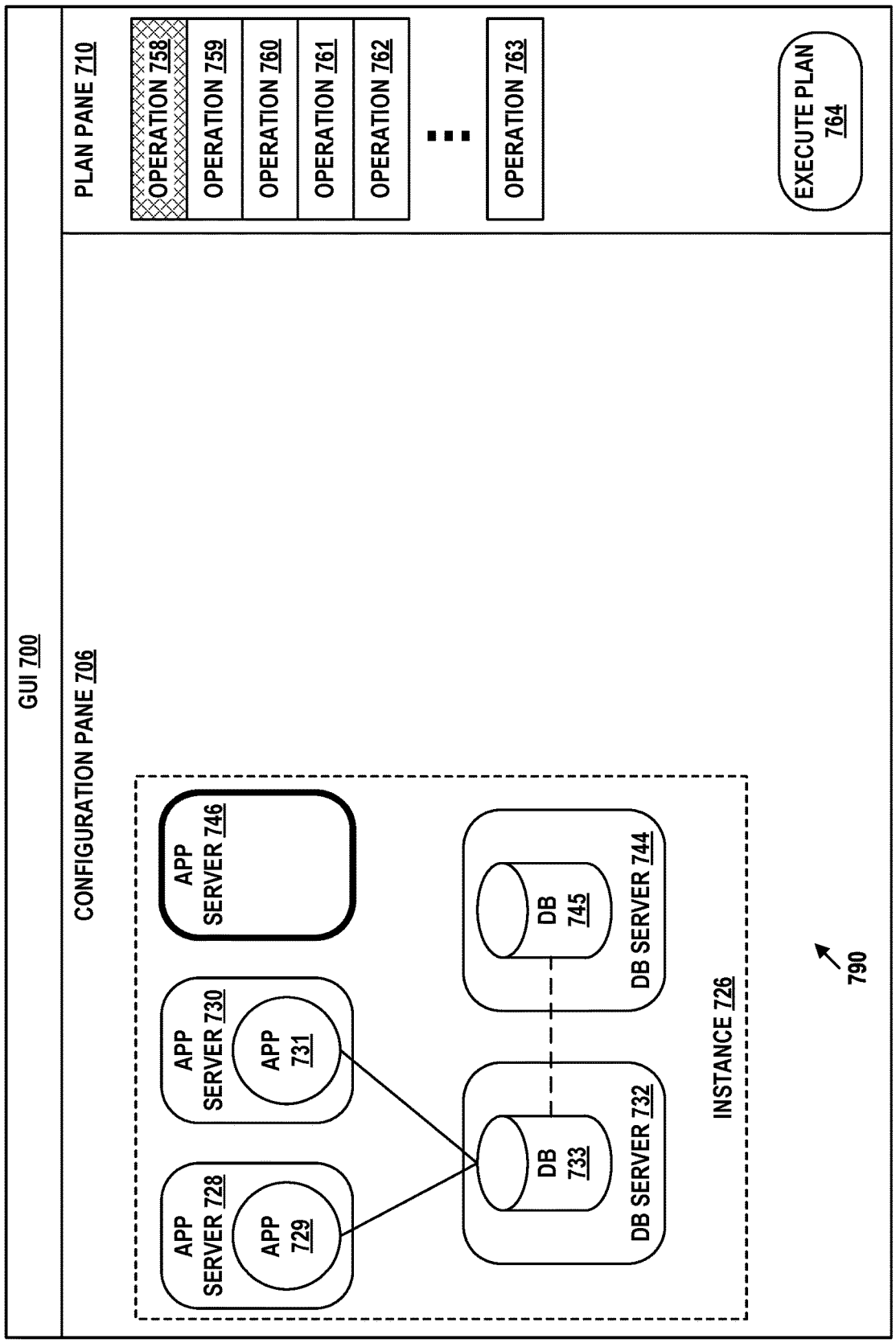
Figure 7G:
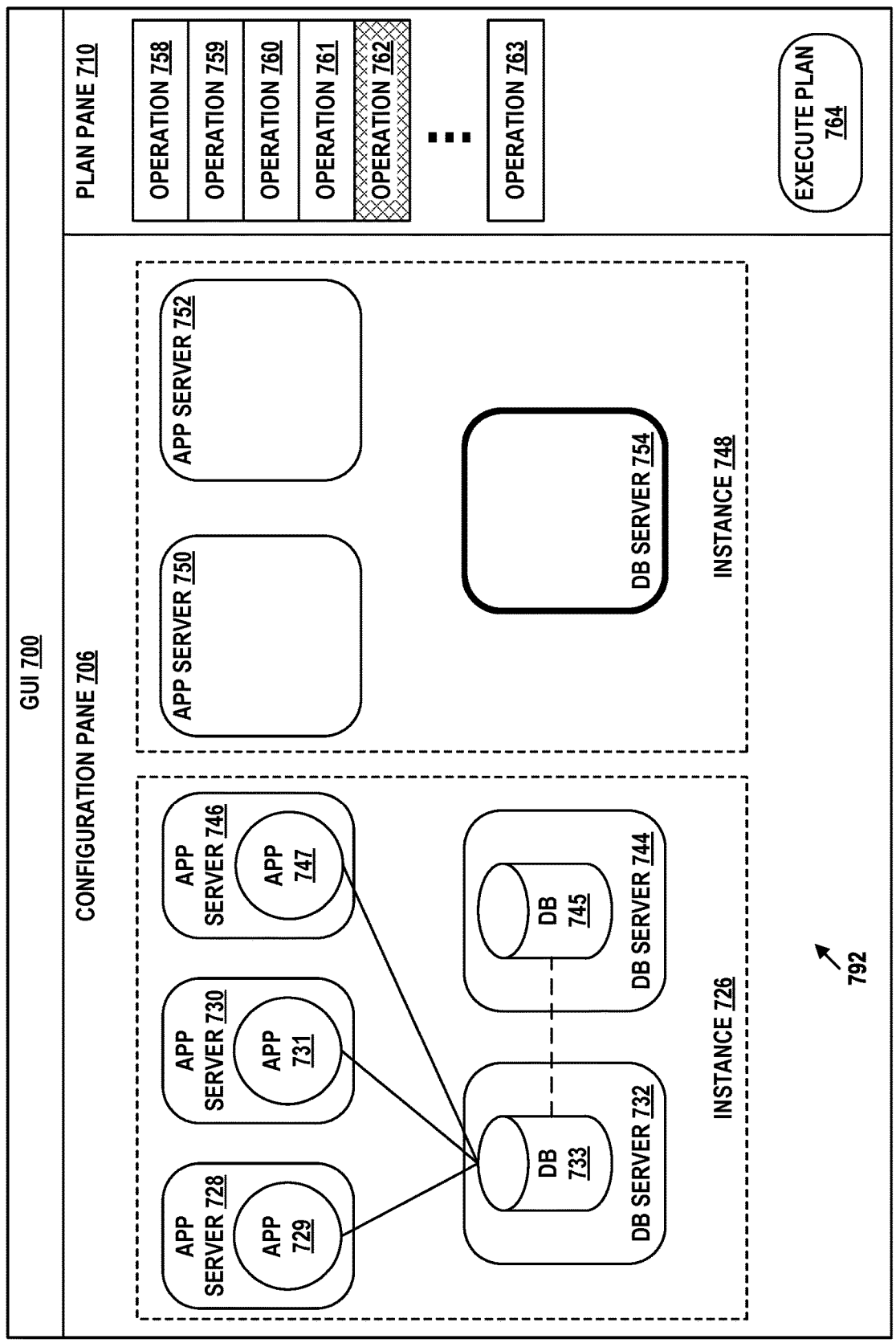

State transition model 630 may be configured to determine intermediate state(s) 628 based on operation(s) 626. For example, state transition model 630 may be configured to determine, for each respective operation of operation(s) 626, a corresponding intermediate state illustrating an expected state of deployed computing resources 604 after execution of the respective operation. Intermediate state(s) 628 may be provided to GUI engine 614, which may be configured to generate a graphical representation thereof. Thus, intermediate state(s) 628, when visualized by way of the GUI, may provide a graphical representation of the expected effects of operation(s) 626 on the state of deployed computing resources 604 of cloud computing system 602. Accordingly, intermediate state(s) 628 may allow a user to visually preview the changed expected to be made by operation(s) 626, which may be considered by the user in specifying operation modification(s) 632. FIGS. 7E, 7F, and 7G provide example graphical representations of intermediate states.

Figure 7H:
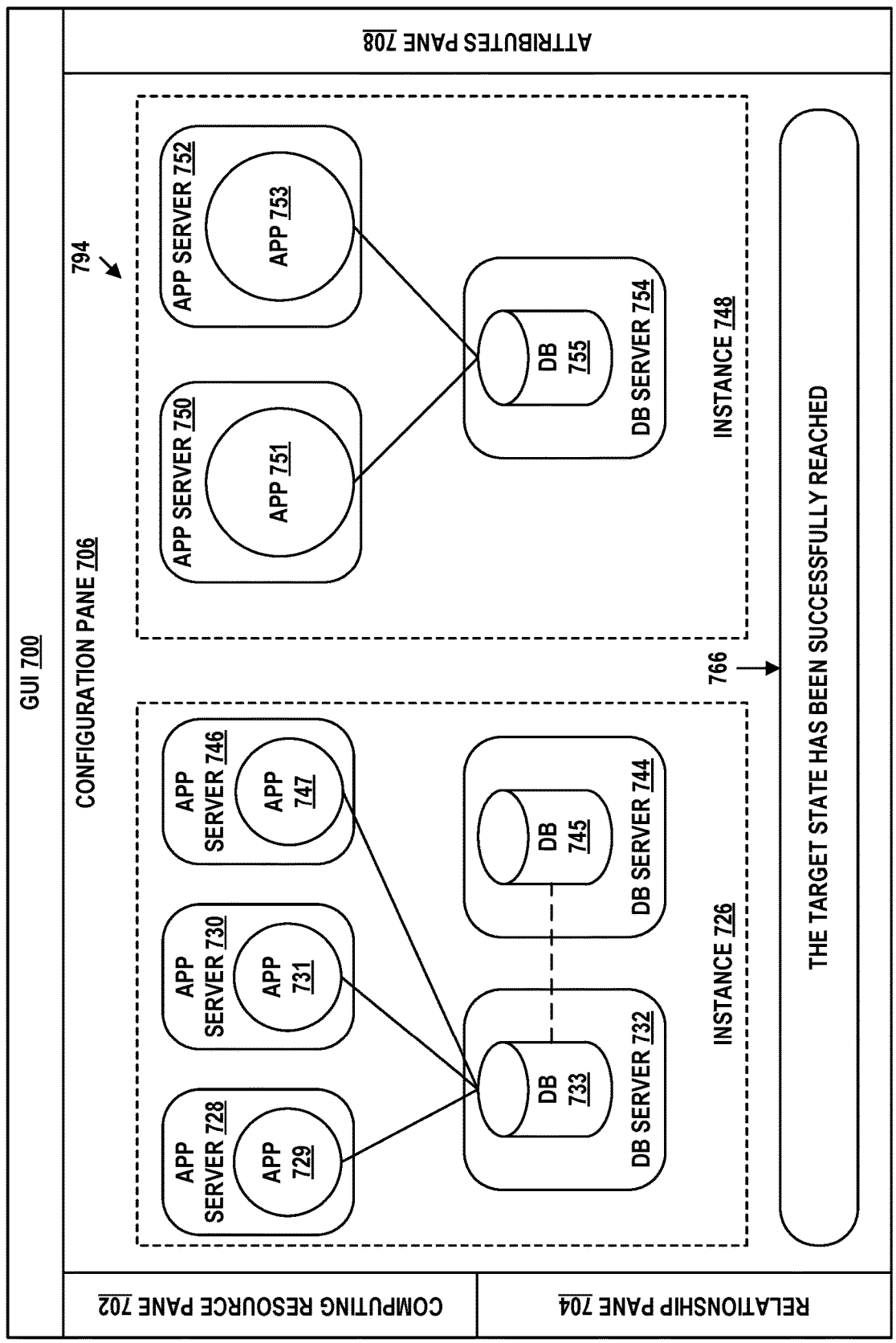
Figure 7I:
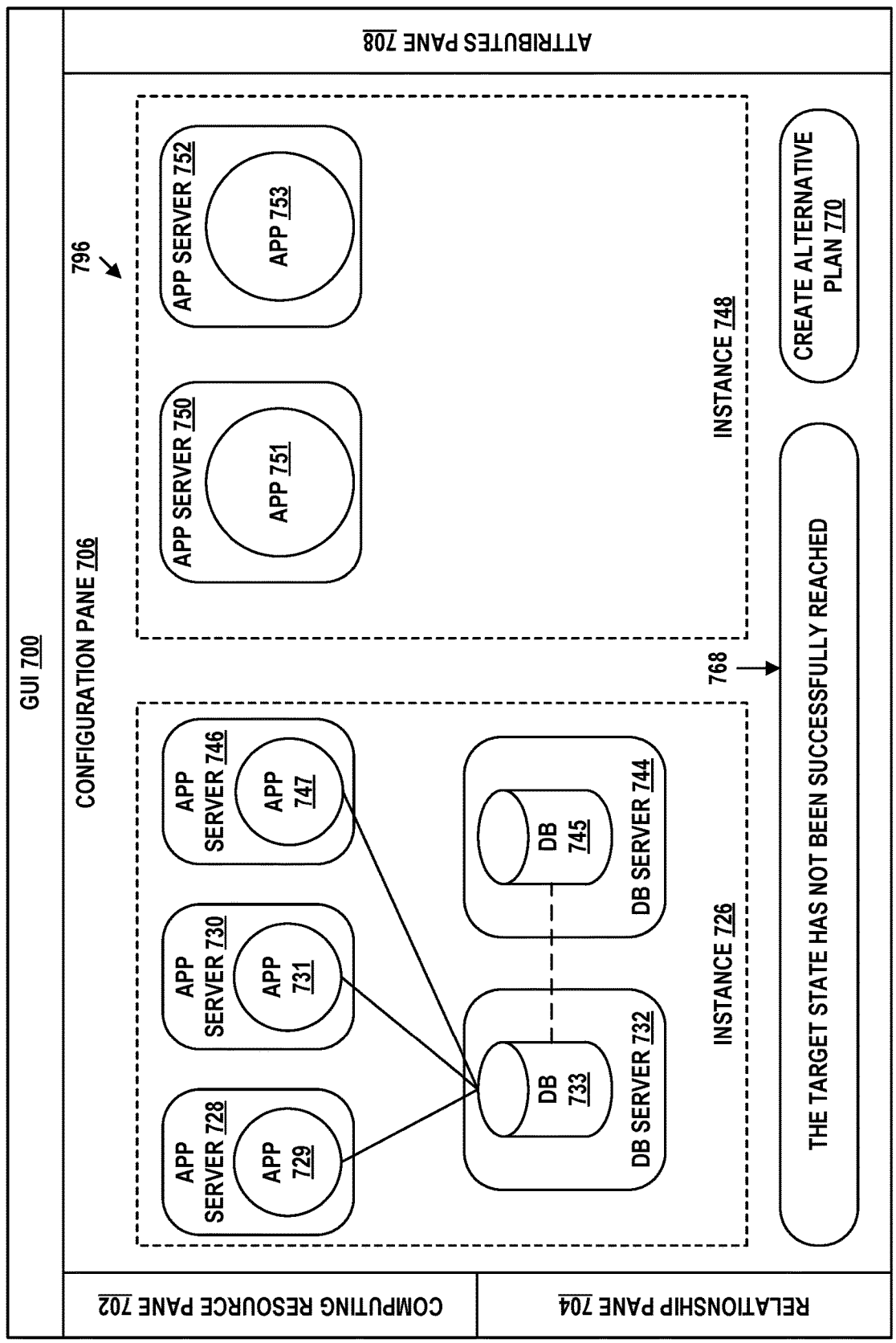

After execution of operation(s) 626, software application 600 may be configured to determine a final state of deployed computing resources 604 resulting from execution of operation(s) 626, and generate a visual representation of the final state. The final state may be based on checking the actual state of deployed computing resources 604 and/or based on return values of operation(s) 626. For example, the final state may be determined by state generator 610 based on updated CIs obtained from cloud computing system 602 after execution of operation(s) 626. Additionally or alternatively, the final state may be determined by state generator 610 based on return values of operation(s) 626, which may indicate whether operation(s) 626 (and thus the modifications expected to be made thereby) were executed successfully. Specifically, a modification expected to be performed by a respective operation of operation(s) 626 may be determined to have been successfully implemented when a return value of the respective operation indicates successful execution of the respective operation, and the modification may be determined to have been unimplemented when the return value of the respective operation indicates erroneous execution of the respective operation. FIGS. 7H and 7I provide example graphical representation of final states.

VII. Example GUI

FIGS. 7A, 7B, 7C, 7D, 7E, 7F, 7G, 7H, 7I, and 7J illustrate example GUIs that may be generated by software application 600 to facilitate deployment of computing resources on cloud computing system 602. Specifically, FIG. 7A illustrates GUI 700, which may be generated by GUI engine 614. GUI 700 may include computing resource pane 702, relationship pane 704, configuration pane 706, and attributes pane 708, each of which may include interactive GUI components.

Computing resource pane 702 may include visual representations of computing resource types that are available on cloud computing system 602. Computing resource pane 702 may include, for example, server icon 712 (representing server hardware and/or software), database ("DB") icon 714 (representing database hardware and/or software), application ("app") icon 716 (representing a software application), and instance icon 718 (representing a computational instance), among other possibilities. Relationship pane 704 may include visual representations of relationship types that are available on cloud computing system 602 among the different computing resource types provided thereby. Relationship pane 704 may include, for example, application-database connector icon 720, replication connector icon 722, and instance connector icon 724, among other possibilities.

Configuration pane 706 may include visual representations of one or more states (e.g., existing, intermediate, target, final, etc.) of the computing resources of cloud computing system 602. For example, configuration pane 706 as shown in FIG. 7A provides a visual representation of existing state 780 that includes instance 726, app server 728 executing app 729, app server 730 executing app 731, and DB server 732 providing DB 733, where servers 728, 730, and 732 form part of instance 726, and apps 729 and 731 utilize DB 733. The existing state 780 may represent a state of deployed computing resources 604 at a first time.

Attributes pane 708 may include representations of attributes (e.g., properties, parameters, etc.) of computing resources selected by way of configuration pane 706. For example, when app 731 is selected by way of configuration pane 706, as indicated by the hatched pattern thereof in FIG. 7A, attributes pane 708 may display one or more attributes of app 731. App 731 may be associated with attributes 734, 736, 738, and 740 through 742 (i.e., attributes 734-742) having values 735, 737, 739, and 741 through 743 (i.e., values 735-743), respectively. Attributes 734-742 and values 735-743 may represent any user-modifiable aspects of app 731 including, for example, error logging properties, caching properties, security properties, and/or request handling properties, among other possibilities. A corresponding set of resource-specific attributes and values thereof may be modifiable by way of attributes pane 708 for any other computing resource displayed in configuration pane 706.

FIG. 7B illustrates GUI 700 displaying another visual representation of another existing state of computing resources of cloud computing system 602. Specifically, configuration pane 706 as shown in FIG. 7B provides a visual representation of existing state 782 that includes instance 726, app server 728 executing app 729, app server 730 executing app 731, DB server 732 providing DB 733, and DB server 744 providing DB 745, where servers 728, 730, 732, and 744 form part of instance 726, apps 729 and 731 utilize DB 733, and DB 733 is replicated to DB 745. Thus, existing state 782 differs from existing state 780 by DB server 744, DB 745, and the replication connection between DB 745 and DB 733. Existing state 782 may represent a state of deployed computing resources 604 at a second time that is different from the first time. Existing states 780 and 782 may be examples of existing state 612.

Each of computing resource pane 702, relationship pane 704, and attributes pane 708 may be independently collapsible (i.e., capable of being hidden), as shown in FIG. 7B, thus allowing configuration pane 706 to occupy a larger portion of GUI 700.

GUI 700 may allow a user to edit an existing state to define a target state. The target state may be defined by adding computing resources from computing resource pane 702 to the existing state, adding relationships from relationship pane 704 to the existing state, deleting computing resources and/or relationships from the existing state, rearranging computing resources and/or relationships in the existing state, and/or modifying attribute values of one or more of the computing resources of the existing state, among other possibilities. Such modifications to existing state 782 may be made through a combination of clicking, dragging, and/or alphanumeric value entry/editing, among other possibilities.

For example, existing state 782 may be modified to define target state 784, as shown in FIG. 7C. Target state 784 may differ from existing state 782 by state difference 786, as shown in FIG. 7D. Specifically, target state 784 may be defined by (i) adding, to instance 726 of existing state 782, app server 746 executing app 747 and (ii) adding, to existing state 782, instance 748, app server 750 executing app 751, app server 752 executing app 753, and DB server 754 providing DB 755, where servers 750, 752, and 754 form part of instance 748 and apps 751 and 753 utilize DB 755. Other modifications may be made to existing state 782 to reach a different target state. Target state 784 may be an example of target state 616, and state difference 786 may be an example of state difference 622.

In some implementations, target state 784 may be alternatively defined by selecting target state 784 from a plurality of candidate states stored by software application 600. In one example, target state 784 may represent a prior state of deployed computing resources 604 present at a corresponding prior time, and selection of target state 784 may thus operate to restore deployed computing resources 604 to the prior state. In another example, target state 784 may represent one of a plurality of predefined states (e.g., defined by users) that are approved and/or validated for deployment on cloud computing system 602.

State difference 786 may visually represent differences and/or commonalities between existing state 782 and target state 784 using, for example, different line weights, line patterns, and/or colors, among other visual properties. For example, as shown in FIG. 7D, state difference 786 visually represents differences between existing state 782 and target state 784 using thicker lines, while commonalities between existing state 782 and target state 784 are visually represented using thinner lines. Alternatively, state difference 786 could visually represent the differences between existing state 782 and target state 784 by showing only the differences and hiding the commonalities.

GUI 700 may include state difference GUI component 788 configured to allow a user to toggle between viewing target state 784 and state difference 786. Specifically, when state difference GUI component 788 is selected while target state 784 is displayed (as shown in FIG. 7C), state difference GUI component 788 may be configured to cause GUI 700 to display state difference 786. When state difference GUI component 788 is selected while state difference 786 is displayed (as shown in FIG. 7D), state difference GUI component 788 may be configured to cause GUI 700 to display target state 784. Thus, state difference GUI component 788 may allow a user to visualize changes made to existing state 782.

GUI 700 may also include plan creation GUI component 756 configured to cause software application 600 to generate one or more operations for reaching target state 784 from existing state 782 (i.e., for effectuating state difference 786). For example, selection of plan creation GUI component 756 may be configured to cause GUI 700 to display plan pane 710 that includes (i) representations of operations 758, 759, 760, 761, and 762 through 763 (i.e., operations 758-763) and (ii) execution GUI component 764, as illustrated in FIG. 7E. Operations 758-763 may be examples of operation(s) 626. Execution GUI component 764 may be configured to trigger execution of operations 758-763.

Each respective operation of operations 758-763 may be selectable to cause GUI 700 to display a visual representation of an intermediate state expected to be reached after execution of the respective operation. For example, FIG. 7E indicates selection of operation 763 from plan pane 710. Operation 763 may be expected to establish connections between DB 755 and each of apps 751 and 753. Since operation 763 is the last operation of operations 758-763, after execution of operation 763 (and all other operations before it), deployed computing resources 604 may be expected to be in target state 784. Accordingly, configuration pane 706 may, based on selection of operation 763, display a visual representation of target state 784, with the connections between DB 755 and each of apps 751 and 753 bolded to indicate that these are established by executing operation 763.

FIG. 7F indicates selection of operation 758 from plan pane 710. Operation 758 may be expected to deploy app server 746 on instance 726, resulting in intermediate state 790. Intermediate state 790 may correspond to existing state 782 with app server 746 added to instance 726. Accordingly, configuration pane 706 may, based on selection of operation 758, display a visual representation of intermediate state 790, with app server 746 bolded to indicate that it is deployed by executing operation 758.

FIG. 7G indicates selection of operation 762 from plan pane 710. Operation 759 may be expected to deploy app 747 on app server 746, operation 760 may be expected to deploy instance 748, operation 761 may be expected to deploy app server 750 and app server 752 on instance 748, and operation 762 may be expected to deploy DB server 754 on instance 748. Thus, execution of operations 758 through 762 may be expected to resulting in intermediate state 792. Accordingly, configuration pane 706 may, based on selection of operation 762, display a visual representation of intermediate state 792, with DB server 754 bolded to indicate that it is deployed by executing operation 758.

Visual representations of corresponding intermediate states reached after execution of other ones of operations 758-763 may also be displayed by GUI 700. By providing for display of visual representations of corresponding intermediate states reached after execution of respective operations proposed for reaching the target state, GUI 700 may allow a user to visually verify that the proposed operations are expected to have the intended effect and/or reach the target state. Specifically, such verification may be performed by a user without dependence on the user's understanding of and/or familiarity with the proposed operations, since a visual review of the intermediate states may be sufficient to verify whether the sequence of intermediate states leads to the target state from the existing state. Thus, the user may verify that the proposed operations are expected to operate as intended by the user when defining the target state.

In some implementations, plan pane 710 may allow for user modification of operations 758-763. For example, single-clicking on operation 758 may cause display of the visual representation of intermediate state 790, while double-clicking (or right-clicking) on operation 758 may allow operation 758 to be manually replaced with an alternative operation. For example, plan pane 710 may be configured to display a filterable list of all available operations, and allow for selection of the alternative operation from this list. Thus, users that have at least some familiarity with the operations may be allowed to customize the proposed operations (e.g., operations 758-763) to, for example, reach target state 784 through an alternative sequence of operations.

FIG. 7H illustrates example contents of GUI 700 in a case where execution of operations 758-763 (e.g., based on and/or in response to selection of execution GUI component 764) results in target state 784 being reached. That is, final state 794 resulting from execution of operations 758-763 may be equal to target state 784. Accordingly, configuration pane 706 may be configured to display message 766 indicating that the target state has been successfully reached.

FIG. 7I illustrates example contents of GUI 700 in a case where execution of operations 758-763 does not result in target state 784 being reached. That is, final state 796 resulting from execution of operations 758-763 may be different from target state 784. For example, as shown in FIG. 7I, final state 796 may be missing DB server 754, DB 755, and connections between DB 755 and apps 751 and 753. Accordingly, configuration pane 706 may be configured to display (i) message 768 indicating that the target state has not been successfully reached and (ii) alternative plan creation GUI component 770.

Final state 796 may differ from target state 784 due to unsuccessful execution of one or more of operations 758-763. Execution of a respective operation may be unsuccessful due to, for example, errors in inputs to the respective operation (e.g., incorrect credentials, missing inputs, etc.), missing and/or incorrect permissions, cloud computing system 602 being unable to deploy a requested computing resource due to lack of availability, cloud computing system 602 throttling the number of operations executable per unit time, failure of other operations on which the respective operation depends (e.g., failure to deploy an app server on which an app is to execute), and/or bugs present in the respective operation or other related instructions, among other possibilities.

Figure 7J:
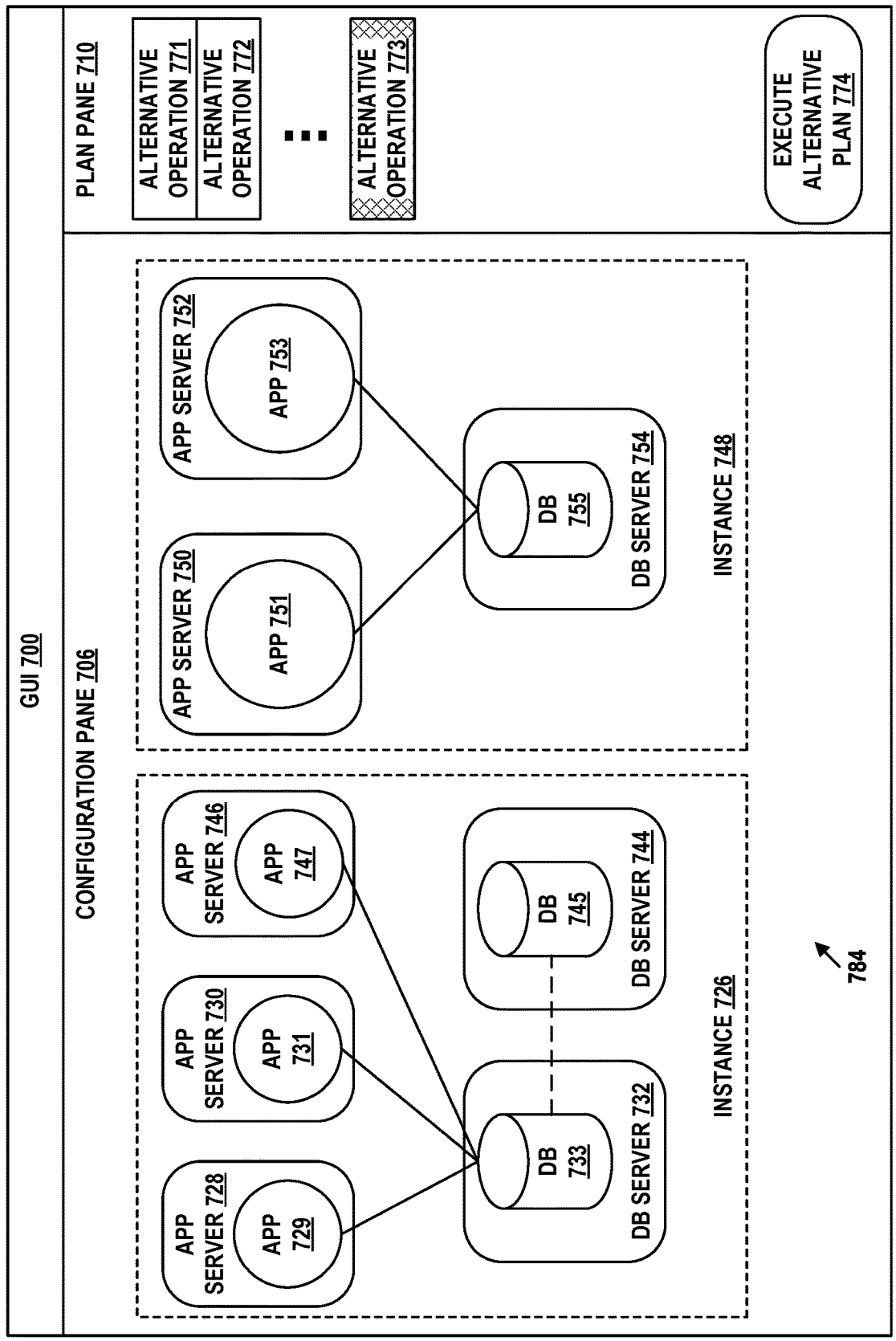

Alternative plan creation GUI component 770 may be configured to trigger a determination of alternative operations for reaching target state 784 from final state 796. For example, as illustrated in FIG. 7J, alternative operations 771 and 772 through 773 (i.e., alternative operations 771-773) may be determined for deploying DB server 754 on instance 748, deploying DB 755 on DB server 754, and establishing connections between DB 755 and each of apps 751 and 753.

Alternative operations 771-773 may differ from the subset of operations 758-763 initially expected to perform this deployment. That is, rather than retrying execution of the subset of operations 758-763 in its original form, alternative operations 771-773 may instead include entirely new operations and/or modified versions of operations of the subset. Accordingly, GUI 700 may allow for automatic correction (or at least attempted correction) of various errors in the execution of operations selected for reaching a target state.

Alternative operations 771-773 may be displayed as part of plan pane 710 along with alternative execution GUI component 774. Alternative execution GUI component 774 may be configured to trigger execution of alternative operations 771-773. Accordingly, alternative plan creation GUI component 770 may operate similarly to plan creation GUI component 756, and alternative execution GUI component 774 may operate similarly to execution GUI component 764. GUI 700 may be configured to display another final state (not shown) resulting from execution of alternative operations 771-773.

VIII. Example Operations

Figure 8:
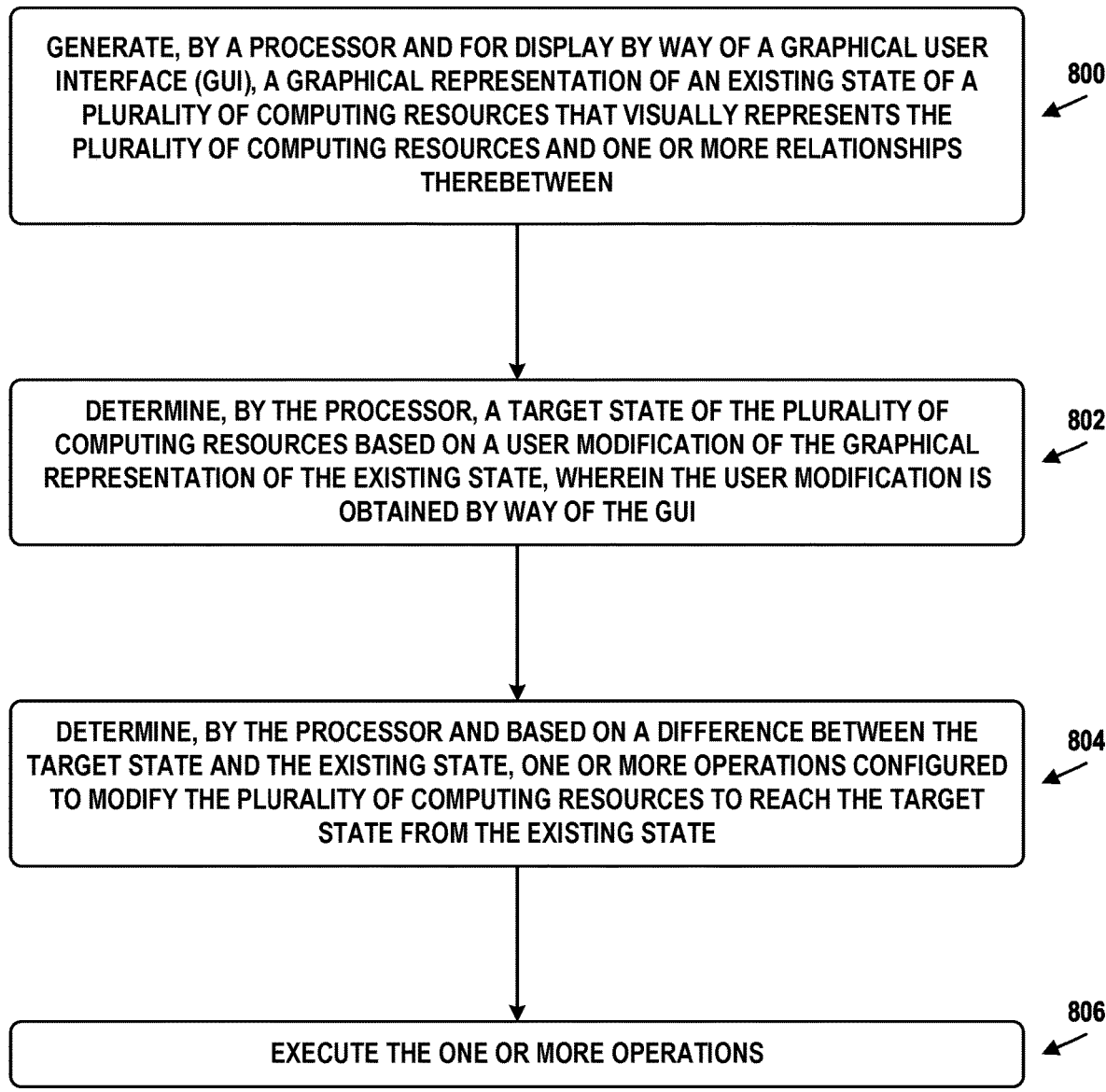
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device. The process illustrated by FIG. 8 may represent operations of software application 600.

The embodiments of FIG. 8 may be simplified by the removal of any one or more of the features shown therein. Further, these embodiments may be combined with features, aspects, and/or implementations of any of the previous figures or otherwise described herein.

Block 800 may involve generating, by a processor and for display by way of a GUI, a graphical representation of an existing state of a plurality of computing resources that visually represents the plurality of computing resources and one or more relationships therebetween.

Block 802 may involve determining, by the processor, a target state of the plurality of computing resources based on a user modification of the graphical representation of the existing state. The user modification may be obtained by way of the GUI.

Block 804 may involve determining, by the processor and based on a difference between the target state and the existing state, one or more operations configured to modify the plurality of computing resources to reach the target state from the existing state.

Block 806 may involve executing the one or more operations.

In some examples, an updated graphical representation of a final state of the plurality of computing resources as modified after execution of the one or more operations may be generated for display by way of the GUI.

In some examples, the final state may differ from the target state. One or more alternative operations may be determined based on a difference between the target state and the final state. The one or more alternative operations may be configured to further modify the plurality of computing resources as modified to reach the target state from the final state. The one or more alternative operations may be executed. An additional updated graphical representation of an additional final state of the plurality of computing resources as further modified after execution of the one or more alternative operations may be generated for display by way of the GUI.

In some examples, the one or more alternative operations may differ from each of the one or more operations.

In some examples, the final state may be equal to the target state. The updated graphical representation of the final state may include an indication that the target state has been reached.

In some examples, generating the updated graphical representation of the final state may include determining a corresponding return value of each respective operation of the one or more operations. The corresponding return value may indicate whether a modification of a corresponding computing resource of the plurality of computing resources has been successfully completed by the respective operation. The final state may be determined based on (i) the existing state and (ii) the corresponding return value of each respective operation of the one or more operations.

In some examples, the one or more operations and an execution GUI component may be provided for display by way of the GUI. The execution GUI component may be configured to trigger execution of the one or more operations when selected. A selection of the execution GUI component may be received. The one or more operations may be executed based on receiving the selection of the execution GUI component.

In some examples, the one or more operations may be provided for display by way of the GUI. A selection of a particular operation of the one or more operations may be received. Based on receiving the selection of the particular operation, a graphical representation of an intermediate state of the plurality of computing resources planned to be reached after execution of the particular operation may be generated for display by way of the GUI.

In some examples, a plan creation GUI component may be provided for display by way of the GUI. The plan creation GUI component may be configured to trigger determination of the one or more operations when selected. A selection of the plan creation GUI component may be received. The one or more operations may be determined based on receiving the selection of the plan creation GUI component.

In some examples, determining the one or more operations may include selecting, based on the difference between the target state and the existing state, one or more automations from a plurality of predefined automations. Each respective automation of the plurality of predefined automations may include one or more corresponding operations configured to control deployment of a corresponding computing resource of a plurality of available computing resources.

In some examples, determining the one or more operations may include determining, based on the difference between the target state and the existing state, two or more computing resources of the plurality of computing resources. Each respective computing resource of the two or more computing resources may differ (e.g., in at least one attribute) between the target state and the existing state. For each respective computing resource of the two or more computing resources, corresponding one or more operations for modifying the respective computing resource may be determined. For example, the corresponding one or more operations may be configured to modify the at least one attribute of the respective computing resource. An order in which to modify the two or more computing resources may be determined. The corresponding one or more operations of each respective computing resource of the two or more computing resources may be executed according to the order in which to modify the two or more computing resources.

In some examples, determining the order may include determining one or more dependencies between the two or more computing resources. The one or more dependencies may indicate that deployment of a first computing resource of the two or more computing resources depends on prior deployment of a second computing resource of the two or more computing resources. The order may be determined based on the one or more dependencies.

In some examples, the one or more operations may be determined independently of manual user input specifying the one or more operations.

In some examples, the GUI may include a computing resource pane that includes, for each respective computing resource type of a plurality of computing resource types available on a remote network management platform, a corresponding resource icon graphically representing the respective computing resource type and configured to provider for addition of the respective computing resource type to the existing state. The GUI may also include a relationship pane that includes, for each respective relationship type of a plurality of possible relationship types available on the remote network management platform among the plurality of computing resource types, a corresponding relationship icon graphically representing the respective relationship type and configured to provider for addition of the respective relationship type to the existing state. The GUI may further include a configuration pane configured to display and provide for the user modification of the graphical representation of the existing state.

In some examples, the plurality of computing resources may be deployed on a remote network management platform on behalf of a managed network. The existing state may be determined by obtaining, from the remote network management platform, a plurality of configuration items (CIs) representing attributes of the plurality of computing resources. The user modification of the graphical representation of the existing state may represent a modification to a respective value of one or more CIs of the plurality of CIs.

In some examples, the plurality of computing resources may include two or more of: (i) a computational instance, (ii) a server node, (iii) a software application, or (iv) a database node.

In some exampled, the one or more operations may be configured to cause one or more of: (i) a deployment of a new computing resource, (ii) deployment of a copy of an existing computing resource, (iii) a restart of the existing computing resource, (iv) a retirement of the existing computing resource, (v) a migration of the existing computing resource, (vi) a modification of an attribute of the existing computing resource, or (vii) a restoration of a previous computing resource.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    generating, by a processor and for display by way of a graphical user interface (GUI), a graphical representation of an existing state of a plurality of computing resources that visually represents the plurality of computing resources and one or more relationships therebetween, wherein the existing state is represented using graphical icons provided by the GUI;
    determining, by the processor, a target state of the plurality of computing resources based on a user modification of the graphical representation of the existing state, wherein the user modification is obtained by way of the GUI, and wherein the user modification comprises a rearrangement of the graphical icons to define the target state from the existing state;
    determining, by the processor and based on a difference between the target state and the existing state, a plurality of operations configured to modify the plurality of computing resources to reach the target state from the existing state;

providing, for display by way of the GUI, the plurality of operations;

receiving a selection, obtained by way of the GUI, of a particular operation of the plurality of operations;

based on receiving the selection of the particular operation, generating, for display by way of the GUI, a graphical representation of an intermediate state of the plurality of computing resources planned to be reached after execution of the particular operation;

causing the graphical representation of the intermediate state to be displayed by way of the GUI; and executing the plurality of operations.

2. The method of claim 1, further comprising:

generating, for display by way of the GUI, an updated graphical representation of a final state of the plurality of computing resources as modified after execution of the plurality of operations.

3. The method of claim 2, wherein the final state differs from the target state, and wherein the method further comprises:

determining, based on a difference between the target state and the final state, one or more alternative operations configured to further modify the plurality of computing resources as modified to reach the target state from the final state;

executing the one or more alternative operations; and generating, for display by way of the GUI, an additional updated graphical representation of an additional final state of the plurality of computing resources as further modified after execution of the one or more alternative operations.

4. The method of claim 3, wherein the one or more alternative operations differ from each of the one or more operations of the plurality of operations.

5. The method of claim 2, wherein the final state is equal to the target state, and wherein the updated graphical representation of the final state comprises an indication that the target state has been reached.

6. The method of claim 2, wherein generating the updated graphical representation of the final state comprises:

determining a corresponding return value of each respective operation of the plurality of operations, wherein the corresponding return value indicates whether a modification of a corresponding computing resource of the plurality of computing resources has been successfully completed by the respective operation; and determining the final state based on (i) the existing state and (ii) the corresponding return value of each respective operation of the plurality of operations.

7. The method of claim 1, further comprising:

providing, for display by way of the GUI, an execution GUI component configured to trigger execution of the plurality of operations when selected; and receiving a selection of the execution GUI component, wherein the plurality of operations are executed based on receiving the selection of the execution GUI component.

8. The method of claim 1, further comprising:

providing, for display by way of the GUI, a plan creation GUI component configured to trigger determination of the plurality of operations when selected; and receiving a selection of the plan creation GUI component, wherein the plurality of operations are determined based on receiving the selection of the plan creation GUI component.

9. The method of claim 1, wherein determining the plurality of operations comprises:

selecting, based on the difference between the target state and the existing state, one or more automations from a plurality of predefined automations, wherein each respective automation of the plurality of predefined automations comprises one or more corresponding operations configured to control deployment of a corresponding computing resource of a plurality of available computing resources.

10. The method of claim 1, wherein determining the plurality of operations comprises:

determining, based on the difference between the target state and the existing state, two or more computing resources of the plurality of computing resources, wherein each respective computing resource of the two or more computing resources differs between the target state and the existing state;

determining, for each respective computing resource of the two or more computing resources, corresponding one or more operations for modifying the respective computing resource;

determining an order in which to modify the two or more computing resources; and executing the corresponding one or more operations of each respective computing resource of the two or more computing resources according to the order in which to modify the two or more computing resources.

11. The method of claim 10, wherein determining the order comprises:

determining one or more dependencies between the two or more computing resources, wherein the one or more dependencies indicate that deployment of a first computing resource of the two or more computing resources depends on prior deployment of a second computing resource of the two or more computing resources; and determining the order based on the one or more dependencies.

12. The method of claim 1, wherein the plurality of operations are determined independently of manual user input specifying the plurality of operations.

13. The method of claim 1, wherein the GUI comprises: (i) a computing resource pane comprising, for each respective computing resource type of a plurality of computing resource types available on a remote network management platform, a corresponding resource icon graphically representing the respective computing resource type and configured to provide for addition of the respective computing resource type to the existing state, (ii) a relationship pane comprising, for each respective relationship type of a plurality of possible relationship types available on the remote network management platform among the plurality of computing resource types, a corresponding relationship icon graphically representing the respective relationship type and configured to provide for addition of the respective relationship type to the existing state, and (iii) a configuration pane configured to display and provide for the user modification of the graphical representation of the existing state.

14. The method of claim 1, wherein the plurality of computing resources is deployed on a remote network management platform, and wherein the method further comprises:

determining the existing state by obtaining, from the remote network management platform, a plurality of configuration items (CIs) representing attributes of the plurality of computing resources, wherein the user modification of the graphical representation of the existing state represents a modification to a respective value of one or more CIs of the plurality of CIs.

15. The method of claim 1, wherein the plurality of computing resources comprises two or more of: (i) a computational instance, (ii) a server node, (iii) a software application, or (iv) a database node.

16. The method of claim 1, wherein the plurality of operations are configured to cause one or more of: (i) a deployment of a new computing resource, (ii) deployment of a copy of an existing computing resource, (iii) a restart of the existing computing resource, (iv) a retirement of the existing computing resource, (v) a migration of the existing computing resource, (vi) a modification of an attribute of the existing computing resource, or (vii) a restoration of a previous computing resource.

17. A non-transitory computer-readable medium, having stored thereon program instructions that, upon execution by a computing system, cause the computing system to perform operations comprising:

generating, for display by way of a graphical user interface (GUI), a graphical representation of an existing state of a plurality of computing resources that visually represents the plurality of computing resources and one or more relationships therebetween, wherein the existing state is represented using graphical icons provided by the GUI;

determining a target state of the plurality of computing resources based on a user modification of the graphical representation of the existing state, wherein the user modification is obtained by way of the GUI, and wherein the user modification comprises a rearrangement of the graphical icons to define the target state from the existing state;

determining, based on a difference between the target state and the existing state, a plurality of operations configured to modify the plurality of computing resources to reach the target state from the existing state;

providing, for display by way of the GUI, the plurality of operations;

receiving a selection, obtained by way of the GUI, of a particular operation of the plurality of operations;

based on receiving the selection of the particular operation, generating, for display by way of the GUI, a graphical representation of an intermediate state of the plurality of computing resources planned to be reached after execution of the particular operation;

causing the graphical representation of the intermediate state to be displayed by way of the GUI; and executing the plurality of operations.

18. The non-transitory computer-readable medium of claim 17, wherein the operations further comprise:

generating, for display by way of the GUI, an updated graphical representation of a final state of the plurality of computing resources as modified after execution of the plurality of operations.

19. A system comprising:

one or more processors; and memory, containing program instructions that, upon execution by the one or more processors, cause the system to perform operations comprising:

generating, for display by way of a graphical user interface (GUI), a graphical representation of an existing state of a plurality of computing resources that visually represents the plurality of computing resources and one or more relationships therebetween, wherein the existing state is represented using graphical icons provided by the GUI;

determining a target state of the plurality of computing resources based on a user modification of the graphical representation of the existing state, wherein the user modification is obtained by way of the GUI, and wherein the user modification comprises a rearrangement of the graphical icons to define the target state from the existing state;

determining, based on a difference between the target state and the existing state, a plurality of operations configured to modify the plurality of computing resources to reach the target state from the existing state;

providing, for display by way of the GUI, the plurality of operations;

receiving a selection, obtained by way of the GUI, of a particular operation of the plurality of operations;

based on receiving the selection of the particular operation, generating, for display by way of the GUI, a graphical representation of an intermediate state of the plurality of computing resources planned to be reached after execution of the particular operation;

causing the graphical representation of the intermediate state to be displayed by way of the GUI; and executing the plurality of operations.

20. The system of claim 19, wherein the operations further comprise:

providing, for display by way of the GUI, an execution GUI component configured to trigger execution of the plurality of operations when selected; and receiving a selection of the execution GUI component, wherein the plurality of operations are executed based on receiving the selection of the execution GUI component.

* * * * *